US010995889B2

(12) United States Patent
Patrick et al.

(10) Patent No.: US 10,995,889 B2
(45) Date of Patent: *May 4, 2021

(54) FLEXIBLE PIPE JOINT HAVING AN ANNULAR FLEXIBLE BOOT THERMALLY OR CHEMICALLY INSULATING AN ANNULAR ELASTOMERIC FLEXIBLE ELEMENT

(71) Applicant: OIL STATES INDUSTRIES, INC., Arlington, TX (US)

(72) Inventors: James G. Patrick, Weatherford, TX (US); Eric Luke, Hurst, TX (US); Danton Gutierrez-Lemini, Cedar Park, TX (US)

(73) Assignee: OIL STATES INDUSTRIES, INC., Arlington, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,776

(22) Filed: May 9, 2019

(65) Prior Publication Data

US 2019/0264850 A1    Aug. 29, 2019

Related U.S. Application Data

(63) Continuation of application No. 15/167,982, filed on May 27, 2016, now Pat. No. 10,337,655.

(Continued)

(51) Int. Cl.
*F16L 27/103*  (2006.01)
*E21B 17/08*   (2006.01)
*F16L 59/18*   (2006.01)

(52) U.S. Cl.
CPC .......... *F16L 27/103* (2013.01); *E21B 17/085* (2013.01); *F16L 59/185* (2013.01)

(58) Field of Classification Search
CPC ...... F16L 27/103; F16L 59/185; E21B 59/185
See application file for complete search history.

(56) References Cited

U.S. PATENT DOCUMENTS

| 3,190,374 A | 6/1965 | Caperan et al. |
| 3,336,054 A | 8/1967 | Blount et al. |

(Continued)

FOREIGN PATENT DOCUMENTS

| CN | 86108675 A | 7/1987 |
| CN | 2266061 Y | 10/1997 |

(Continued)

OTHER PUBLICATIONS

International Search Report and Written Opinion, dated Nov. 8, 2016, 9 pages, by the International Searching Authority for the corresponding International Application No. PCT/162016/053143.

(Continued)

*Primary Examiner* — David Bochna

(57) ABSTRACT

A flexible pipe joint has a body and an annular elastomeric flexible element flexibly coupling an extension pipe to the body and operable to pivot the extension pipe with respect to the body. The flexible pipe joint also has an annular flexible boot operable to thermally or chemically insulating the annular elastomeric flexible element from the fluid flowing through a lumen of the flexible pipe joint. The annular flexible boot encircles the lumen, and the annular flexible boot has a first annular end attached to the extension pipe and a second annular end mounted so that pivoting of the extension pipe with respect to the body causes a flexing of the annular flexible boot, and a majority of the annular flexible boot has a shape conforming to shape of neighboring components of the flexible pipe joint.

21 Claims, 17 Drawing Sheets

Related U.S. Application Data

(60) Provisional application No. 62/168,707, filed on May 29, 2015.

(56) References Cited

U.S. PATENT DOCUMENTS

| | | |
|---|---|---|
| 3,416,819 A | 12/1968 | Day |
| 3,475,039 A | 10/1969 | Ortloff |
| 3,634,387 A | 1/1972 | Dougherty |
| 3,734,549 A | 5/1973 | Loov |
| 3,827,731 A | 8/1974 | Floessel et al. |
| 3,853,337 A | 12/1974 | Herbert et al. |
| 3,854,930 A | 12/1974 | Kentro |
| 4,024,770 A | 5/1977 | Liesenborghs |
| 4,068,864 A | 1/1978 | Herbert et al. |
| 4,068,868 A | 1/1978 | Ohrt |
| 4,098,527 A | 7/1978 | Herbert et al. |
| 4,103,939 A | 8/1978 | Herbert et al. |
| 4,121,861 A | 10/1978 | Gorndt |
| 4,173,360 A | 11/1979 | Bergman et al. |
| 4,183,556 A | 1/1980 | Schwemmer |
| 4,273,363 A | 6/1981 | Angel |
| 4,366,971 A | 1/1983 | Lula |
| 4,416,473 A | 11/1983 | Lamy et al. |
| 4,445,332 A | 5/1984 | Thies et al. |
| 4,461,680 A | 7/1984 | Lashmore |
| 4,515,399 A | 5/1985 | Sullivan et al. |
| 4,570,979 A | 2/1986 | Moore |
| 4,683,917 A | 8/1987 | Bartholomew |
| 4,708,525 A | 11/1987 | Beynet et al. |
| 4,784,410 A | 11/1988 | Peppel et al. |
| 4,804,015 A | 2/1989 | Albinsson |
| 4,984,827 A | 1/1991 | Peppel et al. |
| 5,133,578 A | 7/1992 | Whightsil, Sr. et al. |
| 5,141,259 A | 8/1992 | Highlen et al. |
| 5,268,404 A | 12/1993 | Mowrey |
| 5,553,679 A | 9/1996 | Thorp |
| 6,634,387 B1 | 10/2003 | Glejbol |
| 6,854,930 B2 | 2/2005 | Pionetti |
| 7,341,283 B2 | 3/2008 | Moses et al. |
| 7,402,001 B2 | 7/2008 | Stassen et al. |
| 7,404,695 B2 | 7/2008 | Chenin |
| 7,506,896 B2 | 3/2009 | Richer De Forges et al. |
| 8,038,177 B2 | 10/2011 | Gutierrez-Lemini et al. |
| 8,128,129 B2 | 3/2012 | Gutierrez-Lemini et al. |
| 8,985,636 B2 | 3/2015 | Gutierrez-Lemini et al. |
| 9,797,533 B2 | 10/2017 | Croguenec |
| 9,957,769 B2 | 5/2018 | Ptak |
| 10,337,655 B2 * | 7/2019 | Patrick .................. F16L 27/103 |
| 2003/0019625 A1 | 1/2003 | Moog |
| 2005/0167978 A1 | 8/2005 | Moses |
| 2006/0061092 A1 | 3/2006 | Keyes |
| 2008/0253842 A1 | 10/2008 | Wolbers et al. |
| 2009/0212557 A1 | 8/2009 | Gutierrez-Lemini et al. |
| 2009/0284006 A1 | 11/2009 | Chahine et al. |
| 2009/0320953 A1 | 12/2009 | Fletcher et al. |
| 2014/0346772 A1 | 11/2014 | Gutierrez-Lemini et al. |

FOREIGN PATENT DOCUMENTS

| | | |
|---|---|---|
| CN | 2349433 Y | 11/1999 |
| JP | 2005185096 A | 7/2005 |
| WO | WO 2014/176346 A2 | 10/2014 |

OTHER PUBLICATIONS

Herbert, J. T., et al., "A High-Pressure Swivel for Natural Gas Service and Oscillating Motion in a Marine Environment," Journal of Energy Resources Technology, Sep. 1982, vol. 104, pp. 229-234.
English translation of the First Office Action, dated Nov. 14, 2018, 3 pages, issued by the State Intellectual Property Office of P.R. China, for the corresponding Chinese Patent Application No. 201680039027.9.
English translation of Chinese Publication No. CN 86108675, published on Jul. 1, 1987, (translation generated from Espacenet Feb. 26, 2019, 10 pages).
English Abstract of Chinese Publication No. CN 2266061, published on Oct. 29, 1997, (translation generated from Espacenet Feb. 26, 2019, 2 pages).
English Abstract of Chinese Publication No. CN 2349433, published on Nov. 17, 1999, (translation generated from Espacenet Feb. 26, 2019, 2 pages).
English Abstract of Japanese Publication No. JP 2005185096, published on Jul. 7, 2005, (translation generated from Espacenet Feb. 26, 2019, 2 pages).
Bellows Systems, internet page, printed May 8, 2015, 2 pages, Oil States Industries, Inc., Arlington, TX.
Elastomers/Materials, brochure, 2003, 21 pages, Minnesota Rubber and QMR Plastics, Minneapolis, MN.
Rubber Types and their Properties, Internet page, May 12, 2015, 3 pages, DAVDAR Holding Co., Batavia, IL.
Technical Guide for NOMEX® Brand Fiber, brochure H-52720, Jul. 2001, 40 pages, DuPont, Richmond, VA.
Viton® Performance Information, web page, printed May 12, 2015, 2 pages, DuPont, Richmond, VA.
Fluropolastic Comparison—Typical Properties, web page, printed May 12, 2015, 3 pages, DuPont, Richmond, VA.
Designing with Fluroelastomers, 2004, 14 pages, Zrunek Gummiwaren GmbH, Vienna, Austria.
426 & 436 No-Skive Hoses for High Temperature Applications, brochure, 2004, 2 pages, Parker Hannifin GmbH, Veniano (CO) Italy.
High Temperature Hydraulic Hose—426, Internet page, 2013, one page, Parker Hannifin Corp., Wickliffe, OH.
Introducing G2XH, M4KH and M3KH hoses for high-pressure hydraulic applications, brochure, May 2006, 6 pages, Sates Corporation, Denver, CO.
Craig, Bruce D., Selection Guidelines for Corrosion Resistant Alloys in the Oil and Gas Industry, NiDI Technical Series No. 10073, Jul. 1995. 11 pages, stainless-steel-world.net, 10073 KCI Publishing BV, Zutphen, The Netherlands.
Kane, R.D. and Cayard, M.S., Roles of H2S in the Behavior of Engineering Alloy: A Review of Literature and Experience, Corrosion 98, Paper No. 274, 1998, 28 pages, NACE International, Houston, TX.
HAYNES® 625 Alloy, brochure H-3073D, 2001, 16 pages, Haynes International Inc., Kokomo, IN.
Levy, Charles, The Electrodeposition of Chromium Alloys—A Literature Review, Jan. 1960, 18 pages, Watertown Arsenal Laboratories, Watertown, Mass.
Di Bari, George A., Electrodeposition of Nickel, Modern Electroplating, 2010, pp. 79-114, John Wiley & Sons, Inc., Hoboken, NJ.

* cited by examiner

FLEXIBLE PIPE JOINT HAVING AN ANNULAR FLEXIBLE BOOT THERMALLY OR CHEMICALLY INSULATING AN ANNULAR ELASTOMERIC FLEXIBLE ELEMENT

CROSS REFERENCE TO RELATED APPLICATIONS

The present application is a continuation of application of U.S. patent application Ser. No. 15/167,982, filed May 27, 2016, now U.S. Pat. No. 10,337,655, which claims the benefit of U.S. Provisional Application 62/168,707, filed May 29, 2015 entitled "Thermal or Chemical Insulating Boot for Flexible Elements," of which the full disclosures of these applications are incorporated herein by reference for all purposes.

FIELD

The present invention relates to an annular flexible boot for insulating an annular elastomeric flexible element in a flexible pipe joint from thermal or chemical exposure to fluid flowing through the flexible pipe joint.

BACKGROUND

Elastomeric flexible elements are often used in the oil industry in flexible pipe joints for coupling or supporting segments of a pipeline or riser. A limitation of the elastomeric flexible elements is reduced performance when exposed to heat from fluid flowing in the pipeline or riser, and to chemicals in the fluid. A conventional way of dealing with this limitation is by using a two-stage bellows.

For example, as described in Whightsil, Sr. et al. U.S. Pat. No. 5,133,578, a flexible joint is employed to sealingly connect a pair of tubular members while still permitting limited articulated movement there between. The flexible joint includes a housing with upper and lower ring-like plates coaxially arranged about the tubular members. A pair of annular elastomeric bearings is positioned within the housing and acts against shoulders of the tubular members to flexibly retain the tubular members within the housing. A bellows sealingly couples the tubular members together while permitting movement there between. An annular chamber formed between the bellows and housing is filled with a fluid, such as silicon or oil. Means is provided for adjusting the volume of the chamber or volume of fluid in the chamber to maintain an approximately zero pressure differential across the bellows.

Additional ways of limiting exposure of the elastomeric flexible element to the heat of fluid flowing in a pipeline or riser are described in Moses et al. U.S. Pat. No. 7,341,283 issued Mar. 11, 2008. The flexible joint includes a heat shield of low heat conductivity material integrated into the inner profile of the pipe extension and interposed between the central bore of the pipe joint and the flexible element, low heat conductivity metal alloy components between the hot production fluid and the flexible element, high temperature resistant elastomer at least in the warmest inner elastomer layer of the flexible element, and a flexible element constructed to shift strain from the warmer inner elastomer layers to the colder outer elastomer layers by providing greater shear area, different layer thickness, and/or higher elastic modulus elastomer for the warmer inner elastomer layers.

SUMMARY

A two-stage bellows is the typical way of providing thermal or chemical insulation of an annular elastomeric flexible element of a flexible pipe joint from fluid flowing through the flexible pipe joint. Depending on the particular shape or configuration of the flexible pipe joint, an annular flexible boot, as further described below, will provide thermal or chemical insulation of the annular elastomeric flexible element and will provide one or more advantages in comparison to a two-sage bellows. For example, the annular flexible boot may be more economical to manufacture than a two-stage bellows, and may require a smaller space to be reliably installed or operate in a reliable manner, and may be less sensitive to buckling under certain loads, and may reduce a pressure head on the flexible joint. In many cases, the annular flexible boot can be used as an alternative to a two-stage bellows or in addition to a two-stage bellows, and by specifically adapting the shape of the boot to the type of flexible pipe joint on which it is used, the boot will improve upon the benefits of a two-stage bellows.

For example, the materials of the annular flexible boot may be selected to address specific operational requirements, and the boot may include multiple component layers that provide chemical isolation, thermal insulation, and/or pressure containment. The multiple component layers may include plastic or metal alloy foil, which may, for example, be adhered or bonded to fabric reinforced elastomer layers, in order to construct a redundant system to both isolate the annular elastomeric flexible element from the fluid flowing through the flexible pipe joint and thermally insulate the annular elastomeric flexible element from the fluid.

The annular flexible boot encircles the lumen of the flexible pipe joint, and the annular flexible boot has a first annular end attached to the extension pipe and a second annular end mounted so that pivoting of the extension pipe with respect to the body causes a flexing of the annular flexible boot, and a majority of the annular flexible boot has a shape conforming to the shape of neighboring components of the flexible pipe joint. For example, the annular ends are secured and sealed by adhesive boding agent, and a mechanical connection may also be used to add to the effectiveness of the attachment and the seal. An end portion of the annular flexible boot may be cylindrical for sealing against an inner cylindrical surface of an extension pipe, attachment member, body, or center ring of the flexible pipe joint. An end portion may be shaped in the form of an annular disk or spherical zone for sealing against an end of an extension pipe, attachment member, or centering ball.

In contrast to a bellows, a majority of the annular flexible boot is shaped to conform to neighboring members of the flexible pipe joint. This provides a more compact size for the flexible pipe joint, and a reduction in weight of the housing of the flexible pipe joint. In many cases, a majority of the annular flexible boot may be mechanically supported by contact with the neighboring members of the flexible pipe joint.

In accordance with a basic aspect, a flexible pipe joint includes a body, an attachment member mechanically coupled to the body for attaching the body to a first segment of a pipeline, and an extension pipe extending from the body for attaching the body to a second segment of the pipeline. The flexible pipe joint further includes at least one annular elastomeric flexible element flexibly coupling the extension pipe to the body to permit articulation of the flexible pipe joint by pivoting of the extension pipe with respect to the body. The attachment member and the extension pipe define a lumen through the flexible pipe joint for fluid from the pipeline to flow through the flexible pipe joint, and the at least one annular elastomeric flexible element encircles the lumen. The flexible pipe joint further includes an annular flexible boot for thermally or chemically insulating the at least one annular elastomeric flexible element from the fluid flowing through the flexible pipe joint, wherein the annular flexible boot encircles the lumen, and the annular flexible boot has a first annular end attached to the extension pipe and a second annular end mounted so that pivoting of the extension pipe with respect to the body causes a flexing of the annular flexible boot, and a majority of the annular flexible boot has a shape conforming to the shape of neighboring components of the flexible pipe joint.

In a first example, the annular flexible boot has a cylindrical shape conforming to a cylindrical central lumen of a flexible pipe joint. The cylindrical boot functions as a central sleeve for containing and sealing the fluid medium within the central lumen, and chemically and/or thermally insulating the elastomeric flexible element from the fluid medium. Each end of the cylindrical boot may be sealed against an end of a respective extension pipe or attachment member. The sealing of each end of the cylindrical boot may include use of an adhesive boding agent and use of a mechanical connection to add to the effectiveness of the seal. The cylindrical boot may also pass through a center ring of a pressure isolation unit including two diametrically disposed coaxial secondary elastomeric flexible elements coupling the centering ball to an extension pipe and an attachment member, and in this case each end of the cylindrical boot may be sealed against a respective end of the pressure isolation unit, or against an end of a respective extension pipe or attachment member.

In a second example, the annular flexible boot has a shape conforming to an outer shape of the annular elastomeric flexible element. The annular flexible boot is manufactured, for example, by forming individual sheets of elastomer layers and impervious material into the outer shape of the elastomeric flexible element, and laminating the individual sheets together. Once the annular flexible boot is installed, ends of the boot seal against respective mounting bodies of the annular elastomeric flexible element. The small volume between the annular elastomeric flexible element and the annular flexible boot may be filled with a hydraulic fluid that is compatible with the elastomeric material of the annular elastomeric flexible element, in order to provide support to the boot during operation of the annular elastomeric flexible element.

In a third example, an annular flexible boot has a body portion including an outer toroidal shaped portion and two inner portions conforming to the shape of an end of an extension pipe, attachment member, or center ring. The outer toroidal shaped portion is disposed between the two inner portions. For example, each inner portion includes a spherical portion neighboring the toroidal portion and having a shape of a spherical zone, and an end portion for sealing attachment to an inner surface of the extension pipe, attachment member, or center ring. The sealing of each end of the toroidal boot may include use of an adhesive boding agent and use of a mechanical connection to add to the effectiveness of the seal. The end portions may be cylindrical, and seal against an internal cylindrical surface of the extension pipe, attachment member, or center ring. The toroidal boot is manufactured by forming the individual sheets of impervious material and fiber reinforced elastomer layers into a toroidal shape, which is designed to fit between an end of the extension pipe and an end of an attachment member or center ball. In operation, the toroidal boot accommodates articulation of the flexible pipe joint by rolling over an inner ring of the elastomeric flexible element, on one side, and over the surface of the end of the attachment flange or center ring, on the other side. To contain the fluid medium under high pressure, the cavity behind and encircling the toroidal boot can be filled with a hydraulic fluid compatible with the elastomeric material of the elastomeric flexible element, in order to provide mechanical support to the toroidal boot. To contain the fluid medium under low to intermediate pressure, fiber reinforcement of the toroidal boot may sustain the pressure load without the support of hydraulic fluid.

BRIEF DESCRIPTION OF THE DRAWINGS

Additional features and advantages of the invention will be described below with reference to the drawings, in which.

Figure 1:
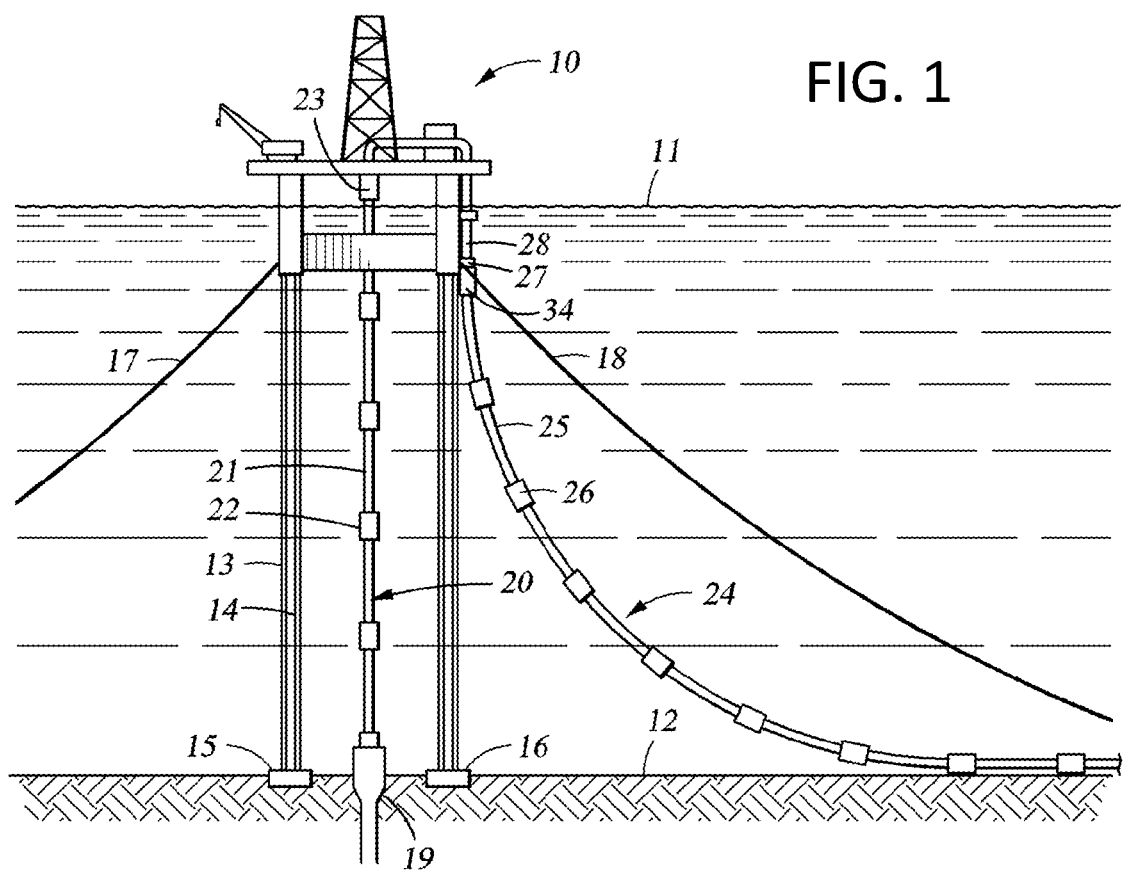
FIG. 1 is a schematic diagram of a tension leg platform (TLP) including a production riser and an export riser in a catenary configuration.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION

With reference to FIG. 1, there is shown an offshore drilling and production vessel generally designated 10 floating on a water surface 11. The floating vessel in particular is a tension leg platform (TLP) secured to the seabed 12 by means of tendons 13, 14 and foundation templates 15, 16. Although not visible in FIG. 1, there is a set of tendons depending from each of four corners of the TLP platform 10 to a respective one of four foundation templates 15, 16. In addition, each of the four lower corners of the TLP platform 10 is secured by a respective lateral mooring line 17, 18 used to move the platform laterally and to resist lateral storm loadings.

For conveying drilling fluids and a drill string from the TLP to a well bore 19 in the seabed 12, and for removing hydrocarbons from the well when drilling has been completed, a production riser generally designated 20 extends from the well bore 19 up to the TLP 10. The riser 20 consists of a number of rigid pipe sections 21 joined by flexible pipe joints 22.

Also shown in FIG. 1 is an export riser generally designated 24 hanging from a leg of the TLP 10 in a catenary configuration and touching down on the seabed 12. The export riser 24, for example, is a pipeline from the TLP 10 to an on-shore facility (not shown), or to a buoy system for loading floating production storage and offloading vessels (FPSO's). The export riser 24 is similar to the production riser 20 in that it is comprised of a number of rigid pipe sections 25 joined by elastomeric flexible pipe joints 26. A flexible pipe joint 27 at the top of the riser 24 is mounted in a side entry slotted receptacle 34 attached to a leg of the TLP 10.

Figure 2:
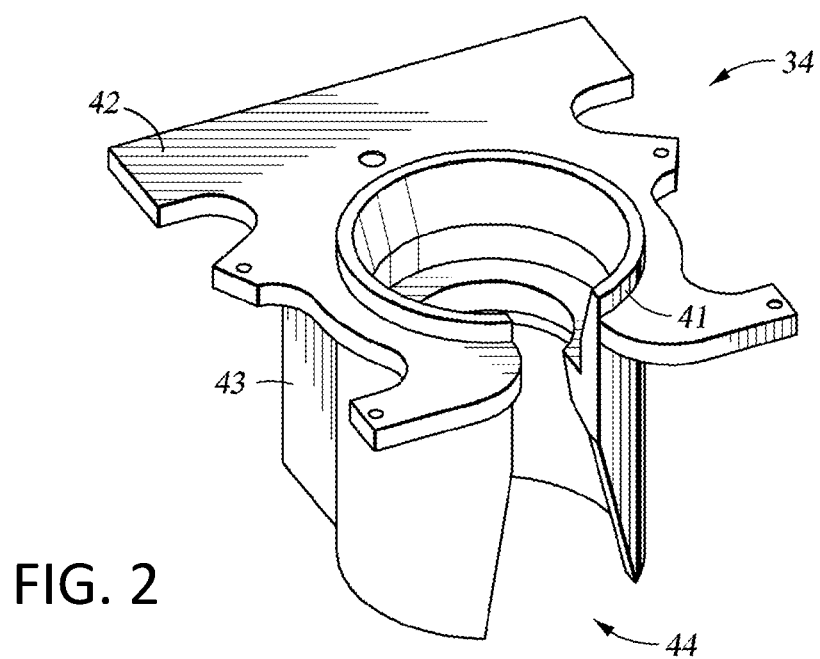
FIG. 2 is an isometric view of a side entry slotted receptacle for mounting the export riser to the TLP in FIG. 1.

FIG. 2 shows the side entry slotted receptacle 34. The receptacle 34 is a weldment consisting of a forged, machined load ring 41 and a number of plates 42, 43. The plates 42, 43, performing as webs and flanges, serve to stabilize the load ring 41 as well as bridge loads between the TLP leg and the export riser.

During installation, the rear portion of the receptacle 34 is welded or otherwise secured to the leg of the TLP, and the upper flexible pipe joint of the export riser is inserted into the load ring 41. The receptacle includes a front slot generally designated 44 for ease of side entry of the export riser during installation.

Flexible joints for risers and for mounting tendons to a TLP have been manufactured and stocked in various sizes for handling various standard sizes of risers or tendons. In addition, there are various kinds of flexible pipe joints especially adapted for different ranges of articulation, axial force (compression or tension), pressure, and temperature. Therefore, the flexible pipe joint 22 in the production riser 20 may be a first kind of flexible pipe joint especially adapted for axial compression and tension when conveying high temperature production fluid, the flexible pipe joint 26 in the export riser 24 may be a second kind of flexible pipe joint especially adapted for axial compression and tension when conveying low temperature production fluid, and the flexible pipe joint 27 at the top of the export riser may be a third kind of flexible pipe joint especially adapted for axial tension and not compression.

Each of the first, second, and third kinds of flexible pipe joint may use an annular elastomeric flexible element for permitting the flexible pipe joint to articulate under axial tension. The annular elastomeric flexible element encircles a central longitudinal lumen of the flexible pipe joint, and the production fluid flows through this lumen. The annular elastomeric flexible element functions as an elastomeric bearing having various advantages over a sliding contact mechanical bearing such as a ball-and-socket joint. For example, the annular elastomeric flexible element has no wear or static friction due to any sliding mechanical contact, and the elastomeric bearing provides a restoring force tending to minimize articulation of the flexible pipe joint, and provides some dampening of the flexing of the flexible pipe joint. The annular elastomeric flexible element may also contain pressure of the production fluid. However, the production fluid may heat the annular elastomeric flexible element, and in some cases chemicals from the production fluid may come into contact with the annular elastomeric flexible element. The heat or chemicals from the production fluid may degrade the elastomer in the annular elastomeric flexible element, and reduce the useful lifetime of the annular elastomeric flexible element.

A two-stage bellows is the typical way of providing thermal and chemical insulation of an elastomeric flexible element of a flexible pipe joint from fluid flowing through the flexible pipe joint. Depending on the particular shape or configuration of the flexible pipe joint, an annular flexible boot, as further described below, will provide thermal or chemical insulation of the annular elastomeric flexible element and will provide one or more advantages in comparison to a two-sage bellows. For example, the annular flexible boot may be more economical to manufacture than a two-stage bellows, and may require a smaller space to be reliably installed or operate in a reliable manner, and may be less sensitive to buckling under certain loads, and may reduce a pressure head on the flexible joint. In many cases, the annular flexible boot can be used as an alternative to a two-stage bellows or in addition to a two-stage bellows, and by specifically adapting the shape of the boot to the type of flexible pipe joint on which it is used, the boot will improve upon the benefits of a two-stage bellows.

Figure 3:
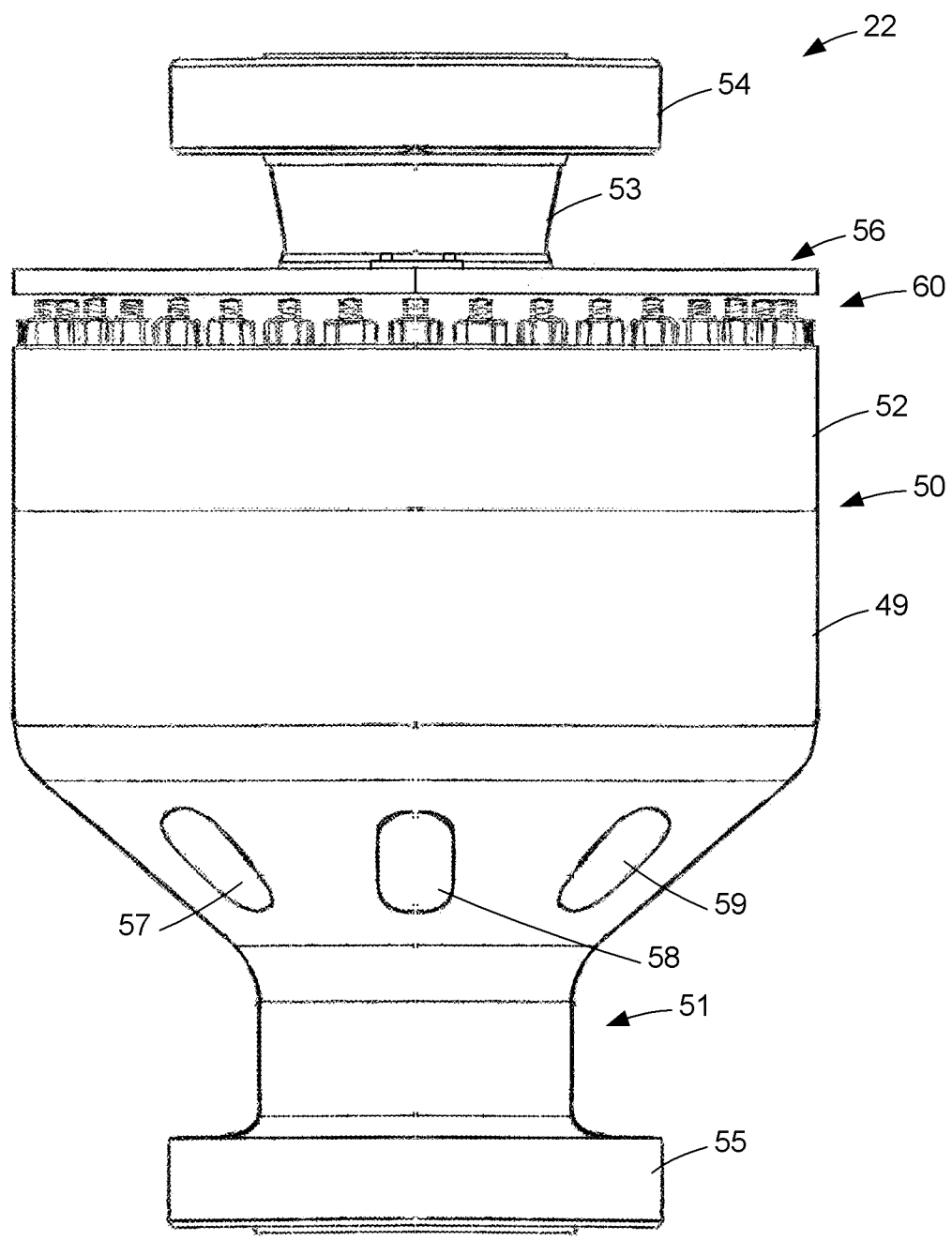
FIG. 3 is a front view of a first kind of flexible pipe joint introduced in FIG. 1.

FIG. 3 shows an example of the first kind of flexible pipe joint 22. The flexible pipe joint 22 includes a cylindrical body 50, an attachment member 51, and an extension pipe 53 extending from the body 50. An upper attachment flange 54 is disposed on an outer end of the extension pipe 53 for attaching an upper segment of a pipeline to the flexible pipe joint 22, and a lower attachment flange 55 is disposed on an outer end of the attachment member 51 for attaching a lower segment of a pipeline to the flexible pipe joint 22. The body 50 is split into an upper half 52 and a lower half 49, and the lower half 49 is integral with the attachment member 51. A circular debris shield 56 is mounted on top of the body 50 to cover a circular array of threaded studs 60 attaching the upper half of the body 50 to the lower half of the body 49. For example, these components are made of a corrosion resistant steel alloy. The lower half 49 of the body 50 has an array of cooling ports 57, 58, 59 spaced about its circumference to permit circulation of seawater for removal of heat from the flexible pipe joint 22 when high temperature fluid is conveyed though the flexible pipe joint.

Figure 4:
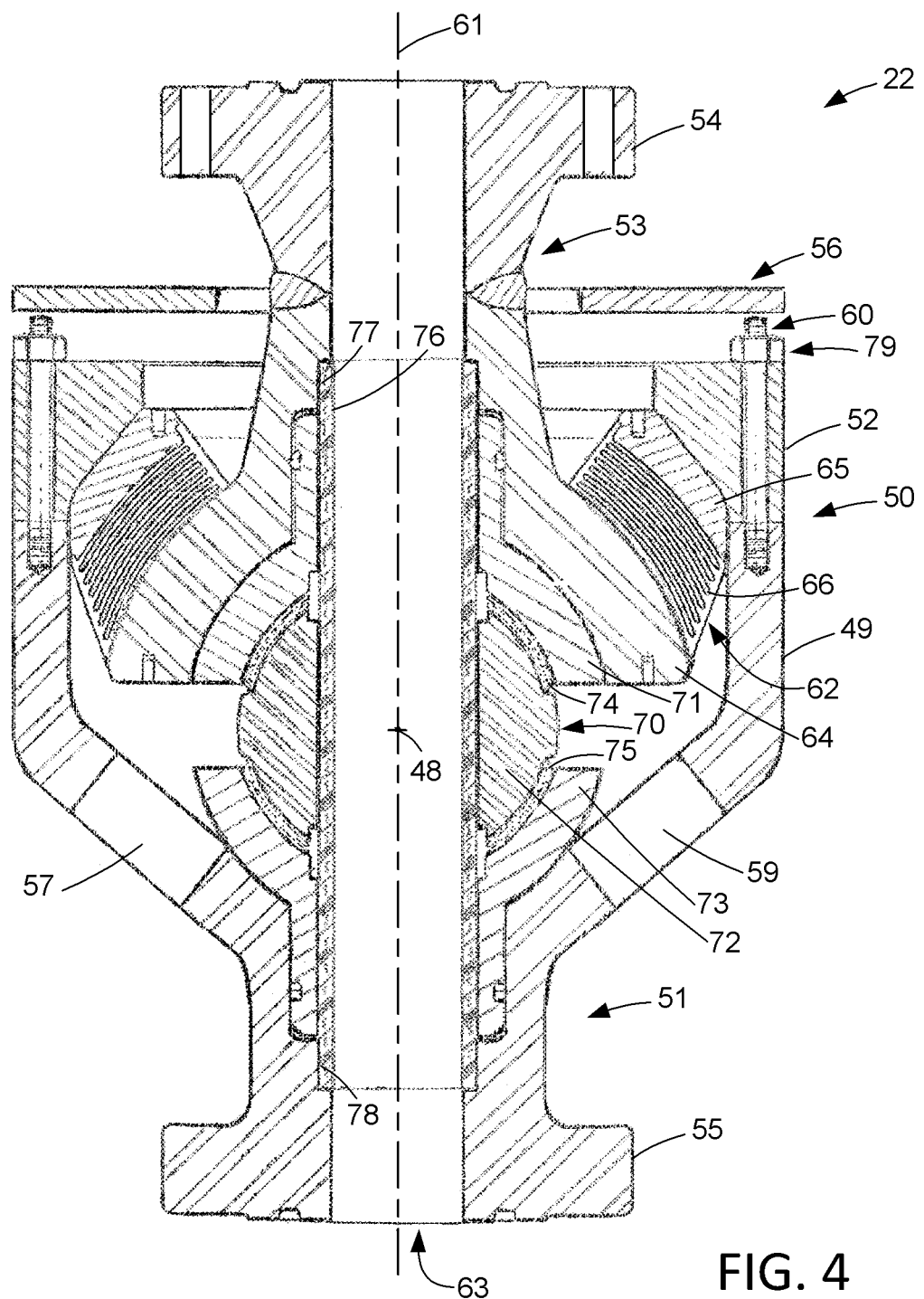
FIG. 4 is a lateral cross-section view of the flexible pipe joint in FIG. 3.

FIG. 4 shows a lateral cross-section of the flexible pipe joint 22. In general, the components of the flexible pipe joint 22 are radially symmetric about a central longitudinal axis 61. The attachment member 51 and the extension pipe 53 define a lumen 63 through the flexible pipe joint 22 for fluid from the pipeline to flow through the flexible pipe joint. A primary annular elastomeric flexible element 62 mounts the extension pipe 53 to the body 50 for pivoting about a center point 48 with respect to the body 51. The annular elastomeric flexible element 62 is referred to as a "primary" annular elastomeric flexible element because it may support tensile load upon the flexible pipe joint, and historically support of tensile load has been the primary function of an annular elastomeric flexible element in a flexible tendon or pipe joint.

Figure 5:
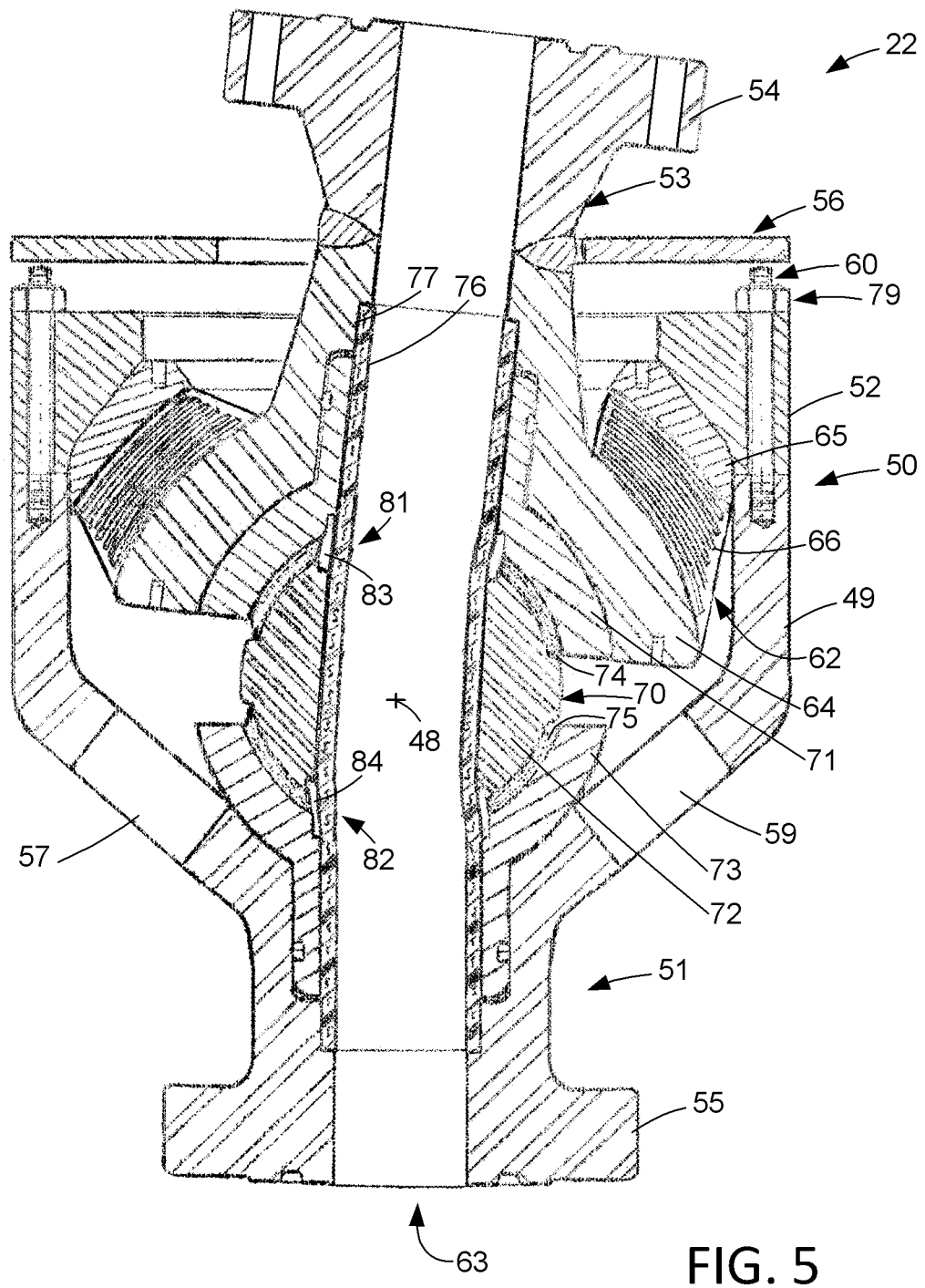
FIG. 5 is a lateral cross-section view of the flexible pipe joint in FIG. 3 articulated at an angle of about five degrees.

Pivoting of the extension pipe 53 with respect to the body 50 results in articulation of the flexible pipe joint 22. In general, the pivoting of the extension pipe 53 about the center point 48 with respect to the body 50 may occur in any radial direction from the central longitudinal axis 61, up to a certain maximum pivot angle. For example, the pivoting may occur in a forward or backward direction, or a left or right direction, or in a combination of these directions. FIG. 5 shows a pivoting of the extension pipe of about five degrees to the right.

The primary annular elastomeric flexible element 62 encircles the central lumen 63 extending from the upper attachment flange 54 to the lower attachment flange 55. In this example, the primary annular elastomeric flexible element 62 also encircles the extension pipe 53. The primary annular elastomeric flexible element 62 is mounted between a hemispherical flange 64 disposed on a lower end of the extension pipe 53, and a load ring 65 seated against the upper part 52 of the body 50, which functions as a retainer flange retaining the annular elastomeric flexible element 62 within the body 50.

For example, during a process of molding the primary annular elastomeric flexible element 62, elastomer of the primary annular elastomeric flexible element is bonded to the hemispherical flange 64, and elastomer of the primary annular elastomeric flexible element is bonded to the load ring 65. For example, the annular elastomeric element 64 includes metal reinforcing rings 66 sandwiched between layers of the elastomer. Each metal reinforcement ring 66 has the shape of spherical zone centered on the center point 48. For example, the metal reinforcements 66 have a thickness in the range of 0.15 to 0.20 inches (3.8 to 5 mm), and the elastomer layers have a thickness in the range of 0.07 to 0.20 inches (1.8 to 5 mm). After the molding of the assembly of the primary elastomeric flexible element 66 and the hemispherical flange 64 and the load ring 65, the upper attachment flange 54 is welded to the hemispherical flange 64 to produce the extension pipe 53.

The flexible pipe joint 22 further includes a pressure isolation unit 70. The pressure isolation unit 70 is described in Danton Gutierrez-Lemini et al. U.S. Pat. No. 8,038,177 issued Oct. 18, 2011 and U.S. Pat. No. 8,985,636 issued Mar. 24, 2015. The pressure isolation unit 70 includes a first liner 71, a center ring 72, a second liner 73, a first secondary annular elastomeric flexible element 74 disposed between the first liner 71 and the center ring 72, and a second secondary annular elastomeric flexible element 75 disposed between the center ring 72 and the second liner 73. The annular elastomeric flexible elements 74, 75 are called "secondary" annular elastomeric flexible elements because they do not have a primary function of carrying an axial tensile load upon the flexible pipe joint 22, and instead their primary function is to carry a compressive axial load upon the flexible pipe joint 33, or carry a pressure load from pressure of fluid within the central lumen 63. The secondary annular elastomeric flexible elements 74, 75, the liners 71, 72, and the center ring 72 all encircle the central lumen 63.

For example, the pressure isolation unit 70 is molded as an integral unit, so that elastomer of the first secondary annular elastomeric flexible element 74 is bonded to the first liner 71 and bonded to the center ring 70, and elastomer of the second secondary annular elastomeric flexible element 75 is bonded to the center ring 70 and bonded to the second liner 73. The two secondary elastomeric flexible elements 74, 75 may include metal reinforcements, each having the shape of a spherical zone centered on the center point 48. The center ring 70 is spherical and centered on the center point 48, and the two secondary annular elastomeric flexible elements 74, 75 have the shape of spherical zones centered on the center point 48. The two secondary annular elastomeric flexible elements 74, 75 are coaxial with the central axis 61, and the center point 48 resides between the two secondary annular elastomeric flexible elements.

The first inner liner 71 is disposed in the extension pipe 53, and the second inner liner 73 is disposed in a pipe section of the attachment member 51, so that the central lumen 63 passes through the pressure isolation unit 70. The secondary annular elastomeric flexible elements 74, 75 can be made of softer elastomer capable of withstanding higher strain that the primary elastomeric flexible element 62, so that the secondary elastomeric flexible elements 74, 75 may be thinner than the primary elastomeric flexible elements even though the secondary annular elastomeric flexible elements are closer to the center point 48 than the primary annular elastomeric flexible element 62.

In order to insulate the annular elastomeric flexible elements 62, 74, and 75 from heat and chemicals from fluid flowing through the central lumen 63, a flexible annular boot 76 in the form of a cylindrical tube provides a segment of the wall of the central lumen 63. To insulate the two secondary annular elastomeric flexible elements 74, 75, the boot 76 is elongated so that the boot is encircled by each of the two annular elastomeric flexible elements 74, 75. To further insulate the primary annular elastomeric flexible element 62, the boot 76 is further elongated so that the boot is also encircled by the primary annular elastomeric flexible element 62. In this example, the central lumen 63 has a constant internal diameter along its length, so that the boot 76 does not obstruct or disrupt the flow of fluid through the lumen 63, or the passage of objects through the lumen 63, such as drill bits, down-hole tools, or pigs.

To assist the boot 76 in maintaining its dimensional integrity under heat and pressure, a majority of the boot has a shape conforming to the shape of neighboring components of the elastomeric flexible pipe joint 22, so that the boot may contact and be supported by these neighboring components. For example, the upper end of the boot 76 is snugly received in a cylindrical recessed internal wall 77 of the extension pipe 53. For chemical insulation and pressure containment, a layer of adhesive bonds the upper end of the boot 76 to the cylindrical recessed internal wall of the extension pipe. The lower end of the boot 76 is snugly received in a cylindrical recessed internal wall 78 of a pipe segment of the attachment member 51. For chemical insulation and pressure containment, a layer of adhesive bonds the upper end of the boot 76 to the cylindrical recessed internal wall 77 of the extension pipe.

The boot 76 has a clearance fit with cylindrical internal walls of the first liner 71, the centering ring 70, and the second liner 73. The clearance fit facilitates assembly of neighboring components 71, 72, 73 around the boot 76 and also enables axial strain upon the boot during pivoting of the extension to be distributed uniformly along the length of the boot in order to minimize build-up of axial strain at any particular location along the length of the boot. Yet the clearance fit permits the boot 76 to be mechanically supported to maintain its cylindrical shape by contact with the neighboring components 71, 72, 73 during flexing of the boot caused by articulation of the flexible pipe joint 22.

For example, the flexible pipe joint 22 is assembled by coating the recessed internal wall 78 of the attachment member 51 and the lower end of the boot 76 with adhesive bonding agent, and inserting the lower end of the boot 76 into the recess of the internal wall 78. Then the pressure isolation unit is slipped onto and lowered down over the boot 76 and seated into the attachment member 51. Then the recessed internal wall 77 of the extension pipe 53 and the upper end of the boot 76 are coated with adhesive bonding agent. Then the assembly of the extension pipe 53, load ring 65, and primary annular elastomeric flexible element 66 is seated upon the first inner liner 71 of the pressure isolation unit, and pushed down so that the upper end of the boot 76 becomes inserted into the recess of the internal wall 77 of the extension pipe 53, and the load ring 65 is received in the lower half 49 of the body 50. Then the threaded studs 60 are screwed into the lower half 49 of the body 50. Then the retainer flange 52 is assembled onto the studs 60, and lowered down onto the load ring 65. Then nuts 79 are threaded onto the studs 60 to seat and secure the retainer flange 52 onto the lower half 49 of the body 50. Then the debris shield 56, which is optional, may be assembled over the studs 60. For example, the debris shield 56 is a split ring that is assembled around the extension pipe 53, so that the debris shield 56 may have an internal diameter smaller than the outer diameter of the upper flange 54.

For example, the adhesive bonding agent is a metal-to-rubber bonding agent such as Chemlock 205/TY-PLY-BN produced by Lord Corporation, 2000 W. Grandview Blvd., P.O. Box 10038, Erie, Pa. See Mowrey U.S. Pat. No. 5,268,404. Another suitable bonding agent is Thixon P-6-EF primer and 532-EF adhesive produced by Rohm and Haas Company, 100 Independence Mall West, Philadelphia, Pa. 19106.

FIG. 5 shows flexing of the boot 76 caused by articulation of the flexible pipe joint 22. The center ring 70 rotates about the center point 48 by half the angle of pivoting of the extension pipe 53 about the center point 48. Deformation of the boot 76 from its initial cylindrical shape in FIG. 4 occurs primarily at a first annular region 81 where the boot is near to the first secondary annular elastomeric flexible element 74, and a second annular region 82 where the boot is near to the second annular elastomeric region.

The annular regions 81, 82 of the boot 76 are not mechanically supported by contact with any of the components of the pressure isolation unit 70. Instead, there are annular gap regions 83, 84 around the annular regions 81, 82 of the boot 76. These annular gap regions 83, 84 can be filled with an incompressible fluid to transfer a majority of the pressure from fluid inside the lumen 63 to the secondary annular elastomeric elements 74, 75. For example, the incompressible fluid is water-based hydraulic fluid compatible with the elastomer of the secondary flexible element, and the water-based hydraulic fluid consists essentially of a mixture of water and an antifreeze agent, such as ethylene glycol or propylene glycol. A suitable incompressible fluid is Compenol water-based hydraulic fluid. For example, the incompressible fluid is introduced into the gap regions 83, 84 after the lower end of the boot 76 has been inserted into and bonded to the recessed internal wall 78 of the attachment member 51, and before the extension pipe 53 has been assembled onto the first insert 71 of the pressure isolation unit 70.

It is also possible to use a boot 76 having sufficient internal reinforcement and made with suitable materials to contain high pressure at the temperature of the fluid flowing through the central lumen 63, so that there would be no need to fill the annular gap regions 83, 84 with incompressible fluid. For example, if the temperature of the fluid flowing through the central lumen 63 has a temperature no greater than 150 degrees centigrade, then the boot 76 may have a construction similar to that of conventional high temperature high pressure flexible hydraulic tubing, provided that the fluid flowing through the central lumen does not contain chemicals incompatible with the polymer material used in such conventional hydraulic tubing. For example, conventional high temperature high pressure flexible hydraulic tubing is made of polychloroethylene thermoplastic, and has one or more layers of steel wire braid reinforcement.

For operation at high temperature, and for compatibility with chemicals in the fluid flowing through the central lumen, there are a number of commercially available polymers that could be substituted for polychloroethylene. For example, substitutes include polyether ether ketone (PEEK), and a variety of fluoropolymers, such as polyvinylidene fluoride (PVDF). Viton® fluoroelastomer, fluorinated ethylene propylene (FEP), and perfluoroalkoxy polymer (PFA). The substitutes have different advantages and disadvantages with respect to desired characteristics such as flexibility, a high maximum operating temperature at which significant creep would occur under the desired operating pressure, chemical stability of the thermoplastic over time at the desired operating temperature, compatibility with respect to chemicals in the fluid flowing through the central lumen, low permeability with respect to chemicals in the fluid flowing through the central lumen and that are incompatible with the elastomer of the secondary annular elastomeric flexible elements, low cost, ease of molding by injection or thermo-compression, and an ability to encapsulate and bond with high temperature resistant reinforcement such as steel wire, fiberglass, or polyaramid fiber (such as Nomex® or Kevlar® fiber). PEEK and PFA may permit operation at temperatures up to 250 degrees Centigrade.

Hydrogen sulfide is a chemical that is often found in hydrocarbon production fluid, and hydrogen sulfide is incompatible with elastomers commonly used in the annular elastomeric flexible elements. For example, the annular elastomer flexible elements are typically made with natural rubber or nitrile butadiene rubber (NBR). For high temperature applications, the annular elastomer flexible elements may be made with temperature resistant rubber such as peroxide cured hydrogenated nitrile butadiene rubber (HNBR). If natural rubber, NBR, or HNBR is subjected to a sufficient concentration of hydrogen sulfide, the hydrogen sulfide may diffuse into and build up in the rubber, and cause blistering of the rubber upon decompression. Hydrocarbon production fluid may contain other invasive gasses that have a similar effect upon the rubber.

In order to insulate the annular elastomer flexible elements from invasive gas, the boot 76 may include one or more metal layers providing a diffusion barrier to invasive gas. The metal layers should also be resistant to any chemical attack from the invasive gas. For example, hydrogen sulfide has a corrosive effect upon common ferrous steel. Stainless steels have more resistance to hydrogen sulfide, but some suffer from stress corrosion cracking when exposed to hydrogen sulfide. Stainless steels resistant to stress corrosion cracking when exposed to hydrogen sulfide include stainless steels having a high percentage of nickel, a low percentage of iron, a moderate percentage of chromium, and a moderate percentage of molybdenum, such as Alloy C276 (e.g., 59% nickel, 5.5% iron, 15% chromium, 16% molybdenum, 3.5% tungsten) or Alloy 625 (e.g., 61% nickel, 5% iron. 21% chromium, 9% molybdenum, 3.5% niobium-tantalum).

In one form of construction, the boot 76 has an inner metal layer providing a diffusion barrier to invasive gas, and the inner metal layer is a cylindrical tube having helical corrugations and constituting the inner wall of the boot 76. For example, the metal layer is made of a stainless steel resistant to stress corrosion cracking when exposed to hydrogen sulfide. The inner metal layer is then surrounded by one or more outer reinforced polymer layers.

In another form of construction, the boot includes a plurality of thin metal layers providing a diffusion barrier to invasive gas. Strain on each metal layer due to deformation from flexing of the boot is reduced by reducing the thickness of each metal layer. Plural metal layers provide redundancy in the event of cracking a single layer. By disposing polymer between the metal layers, the polymer provides resistance to the diffusion of invasive gas even if all the metal layers become cracked, and this resistance is much greater than the diffusion resistance if the metal layers were absent because of misalignment of the cracks in one layer with the cracks in a neighboring layer.

Figure 6:
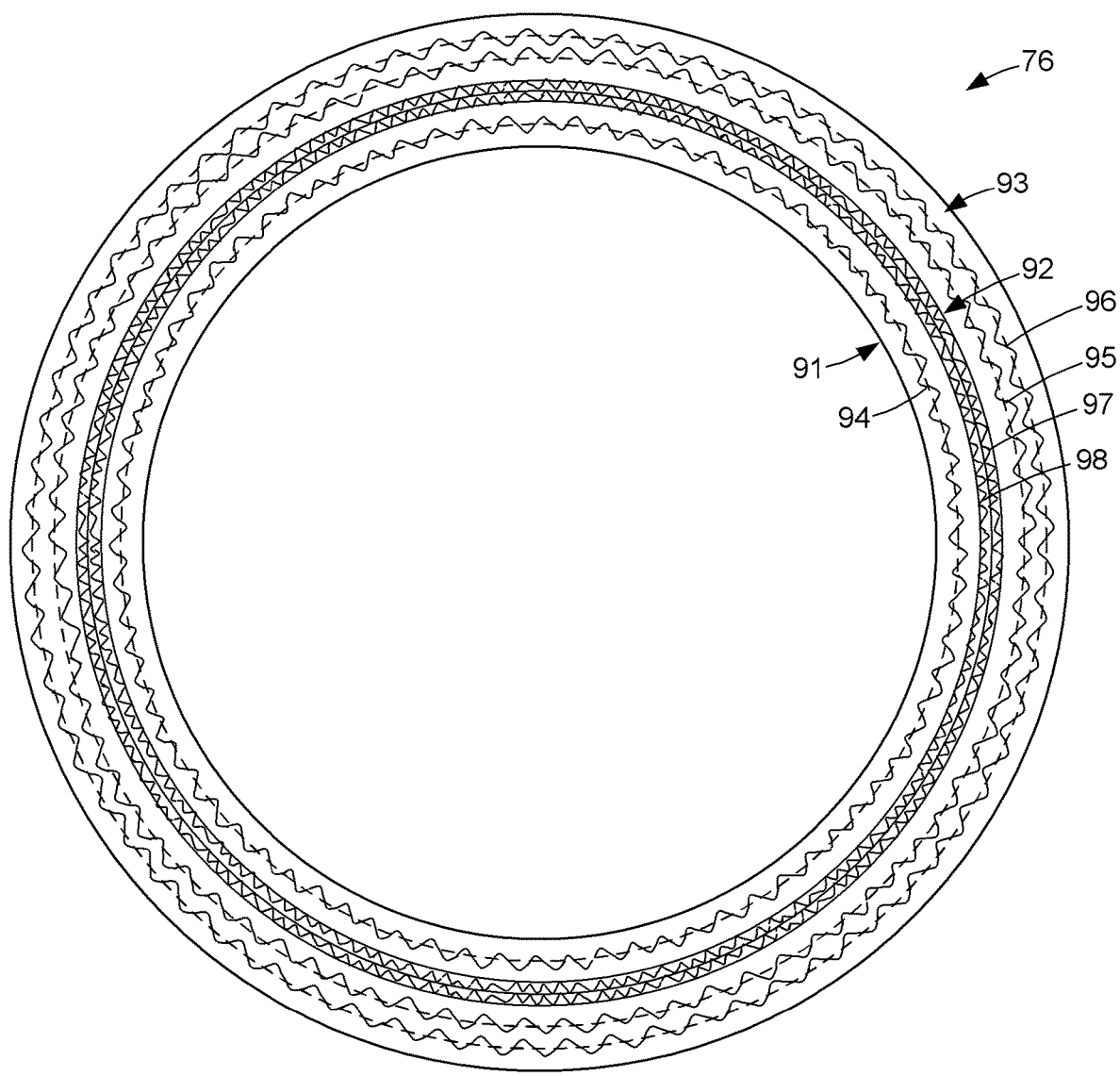
FIG. 6 is a top cross-section view of a cylindrical tubular flexible boot introduced in FIG. 4.

FIG. 6 shows the boot 76 constructed with a reinforced inner layer 91, a middle region 92, and a reinforced outer layer 93. For example, the inner layer 91 is temperature resistant polymer reinforced with a single braid 95 of hydrogen sulfide resistant stainless steel wire. The outer layer 93 is temperature resistant polymer reinforced with two braids 96, 97 of hydrogen sulfide resistant stainless steel wire. The inner layer 91 protects the middle region 92 from abrasion and de-lamination. The outer layer 93 provides pressure containment and ensures dimensional stability of the boot 76 rigidity despite a tendency of the polymer to creep when subjected to heat and pressure. The middle region 92 includes metal layers 97, 98 presenting a diffusion barrier to invasive gas.

In a convenient form of construction, the multiple metal layers in the middle region 92 are made by winding at least one metal foil strip or metalized polymer strip. For example, the metalized polymer is made by deposition of metal onto a polymer sheet. For example, the metal is deposited by vacuum deposition of sputtered metal, or the metal is deposited from a liquid solution by an electroless plating process. For example, the sputtered metal is a hydrogen sulfide resistant stainless steel, or the metal deposited by electroless plating is nickel. It is also possible to electroplate nickel, chromium, or nickel-chromium alloy upon a sputtered metal film or an electroless plated metal film.

Figure 7:
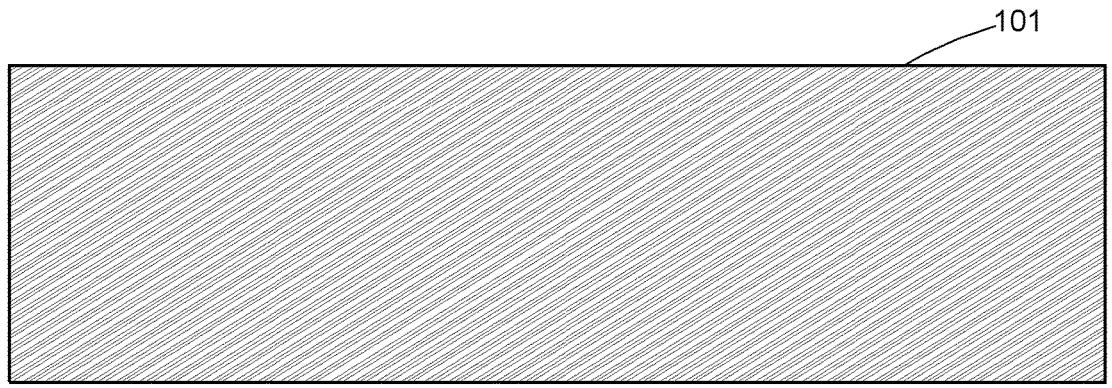
FIG. 7 is a front view of a corrugated strip of metal or metalized plastic film.

In order to reduce strain due to flexing of the boot 76 upon the metal layers 97, 98 in the middle region 92, each of the metal layers has helical corrugations. For example, a sheet of metal foil, or a sheet of metalized polymer, is corrugated by feeding the sheet through a pair of intermeshing rollers. Helical corrugations in the metal layers 97, 98 are obtained by cutting a corrugated sheet into strips so that each strip has diagonal corrugations, and then winding the strips. FIG. 7 shows one such strip 101. A number of corrugated strips could be stacked upon each other before winding them to form the middle layer 92.

In a convenient form of construction, the boot 76 is manufactured by injection molding or thermo-compression molding. Polymer and metal strips are wound upon, and wire braid is slipped over, a cylindrical mandrel defining the inner diameter of the boot 76. Then the assembly of the cylindrical mandrel and the wire braid is placed in a mold defining the outer diameter of the boot 76. For example, the mold has two identical pieces that are clamped around the assembly. In a thermo-compression process, the clamping of the mold may provide compression for fusing the polymer layers together.

Figure 8:
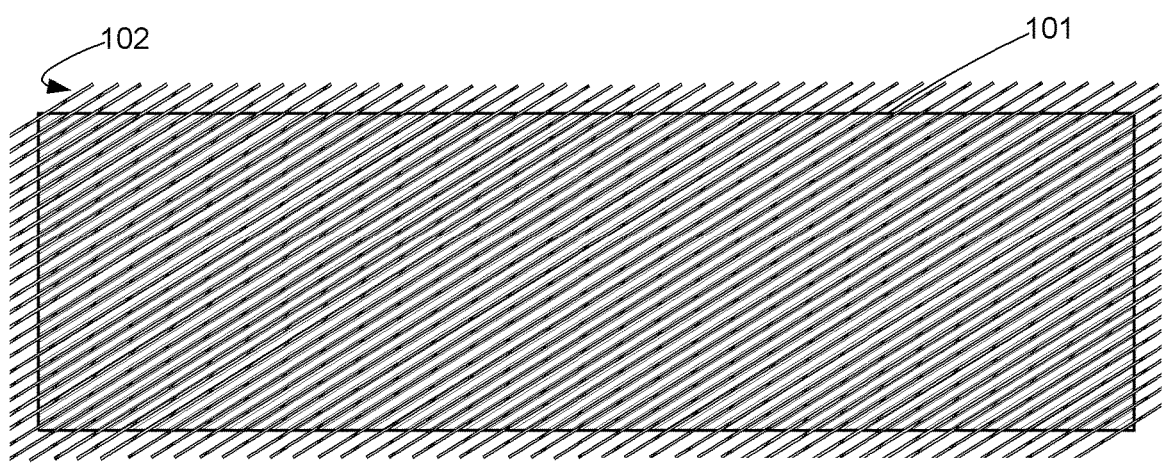
FIG. 8 is a front view of the of the corrugated strip of FIG. 7 with the addition of reinforcement fibers inlaid in the corrugations of the strip of FIG. 7.

A thermo-compression process may have a tendency to flatten the corrugations in the metal layers in the middle region 92. This tendency could be reduced by filling the corrugations of the strips with reinforcements such as stainless steel wire. fiberglass, or polymer fiber. For example, FIG. 8 shows reinforcements 102 inlaid in the corrugations of the strip 101.

Figure 9:
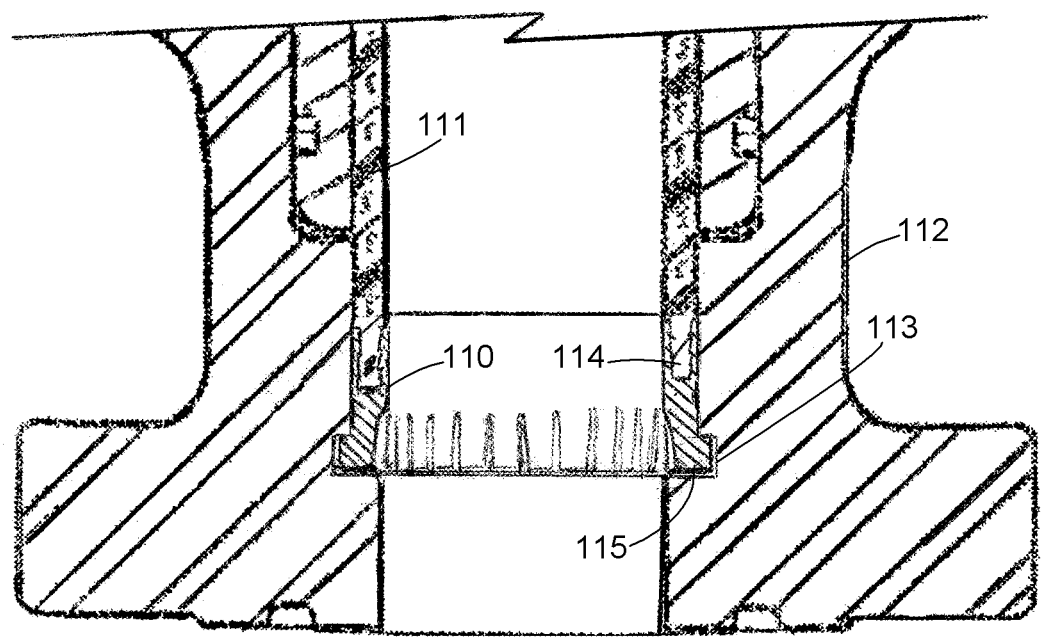
FIG. 9 is a lateral cross-section view of an alternative construction in which a mechanical connector connects an end of a cylindrical tubular flexible boot to the wall of a central lumen of a flexible pipe joint.

For high temperature operation, a mechanical connection may maintain the integrity of the attachment and the seal between the upper end of the boot 76 and the extension pipe 53, and the integrity of the attachment and the seal between the lower end of the boot and the attachment member 51. For example, FIG. 9 shows an alternative construction in which an expandable metal ring 110 provides a mechanical connection between the lower end of the cylindrical tubular boot 111 and the attachment member 112 of a flexible pipe joint. An internal annular grove 113 is machined into the attachment member 112. The lower end of the boot 111 is received in an annular recess 114 in the upper portion of the expandable metal ring 110. The expandable metal ring 110 also has a lower rim 115 conforming to internal annular recess in the body 112.

Figure 10:
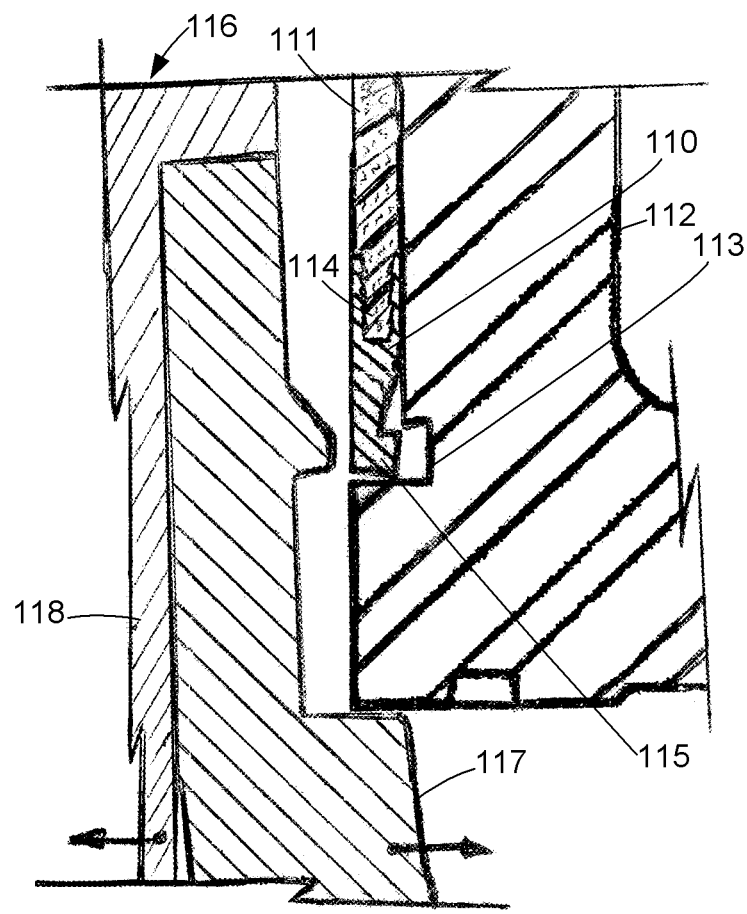
FIG. 10 is a lateral cross-section view of a tool being used to radially expand the mechanical connector of FIG. 9 to connect the end of the cylindrical tubular flexible boot to the wall of the central lumen of the flexible pipe joint.

FIG. 10 shows a tool 116 inserted into the body 112. The tool has a cylindrical portion 118 and a lever 117. The lever is operated to expand the expandable ring 110 by expanding the lower rim 115 into the internal annular groove 113. A similar tool could be used to expand the upper portion of the expandable ring 110 to secure the lower end of the boot 111 in the annular recess 114.

Figure 11:
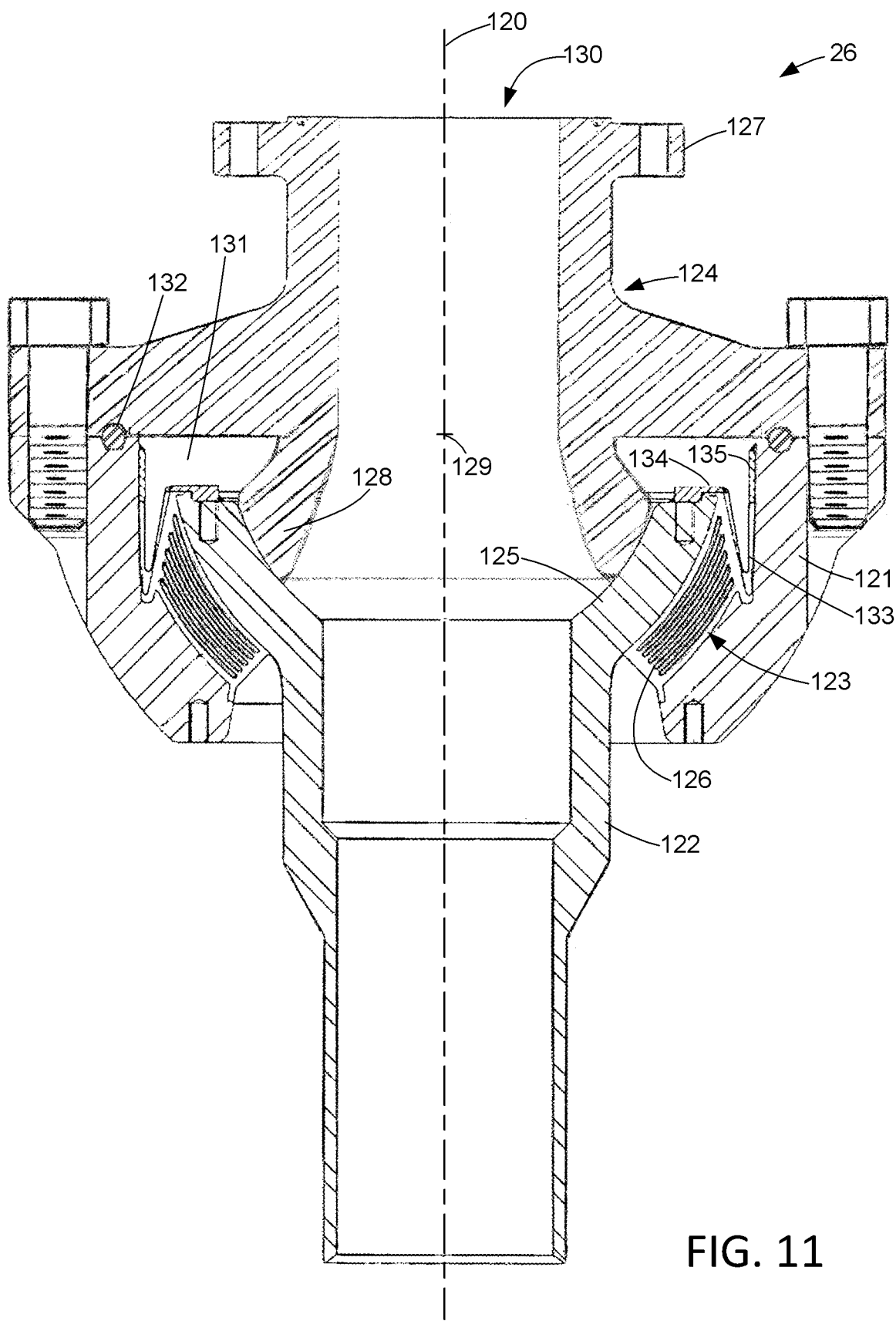
FIG. 11 is a lateral cross-section view of a second kind of flexible pipe joint.
Figure 12:
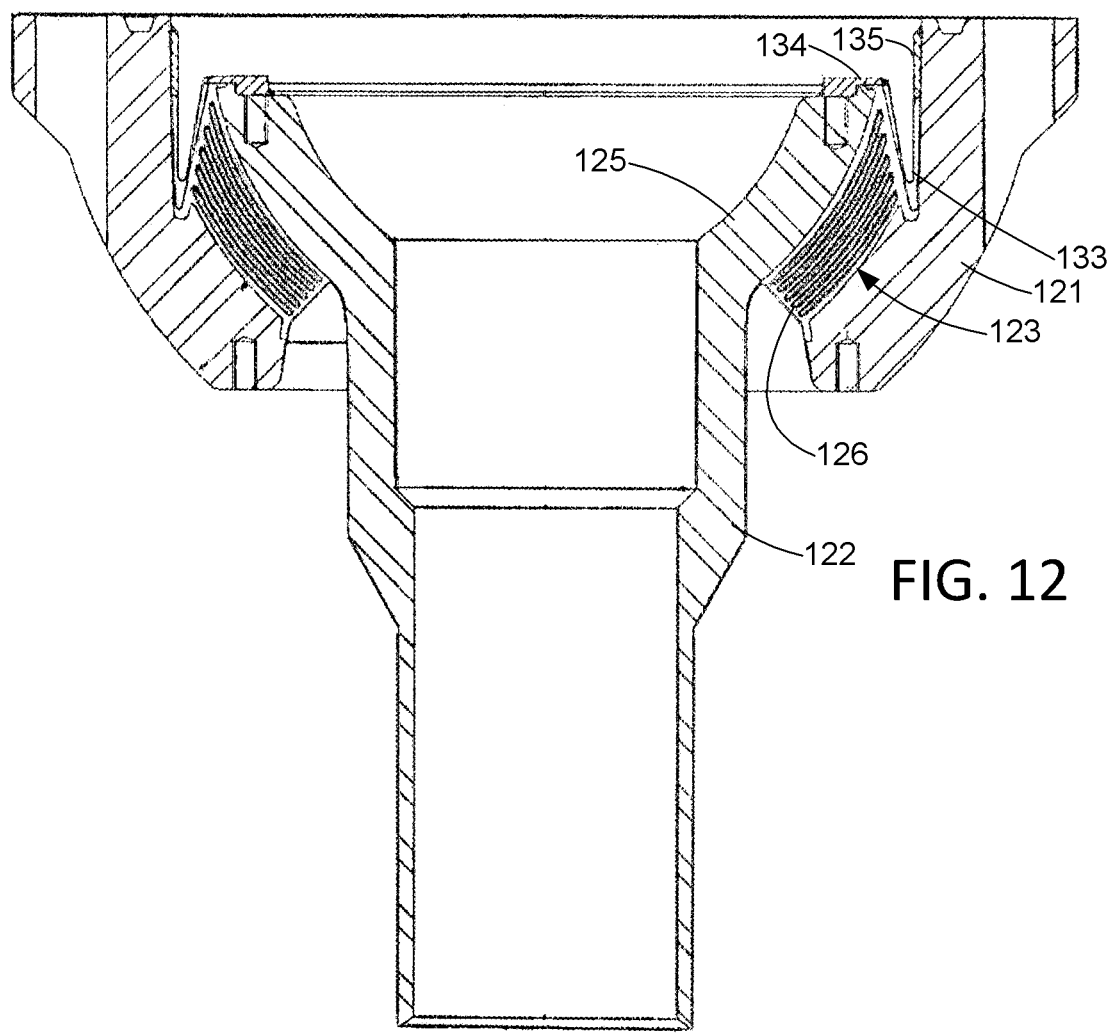
FIG. 12 is a lateral cross-section view of a lower assembly in the flexible pipe joint of FIG. 11.
Figure 13:
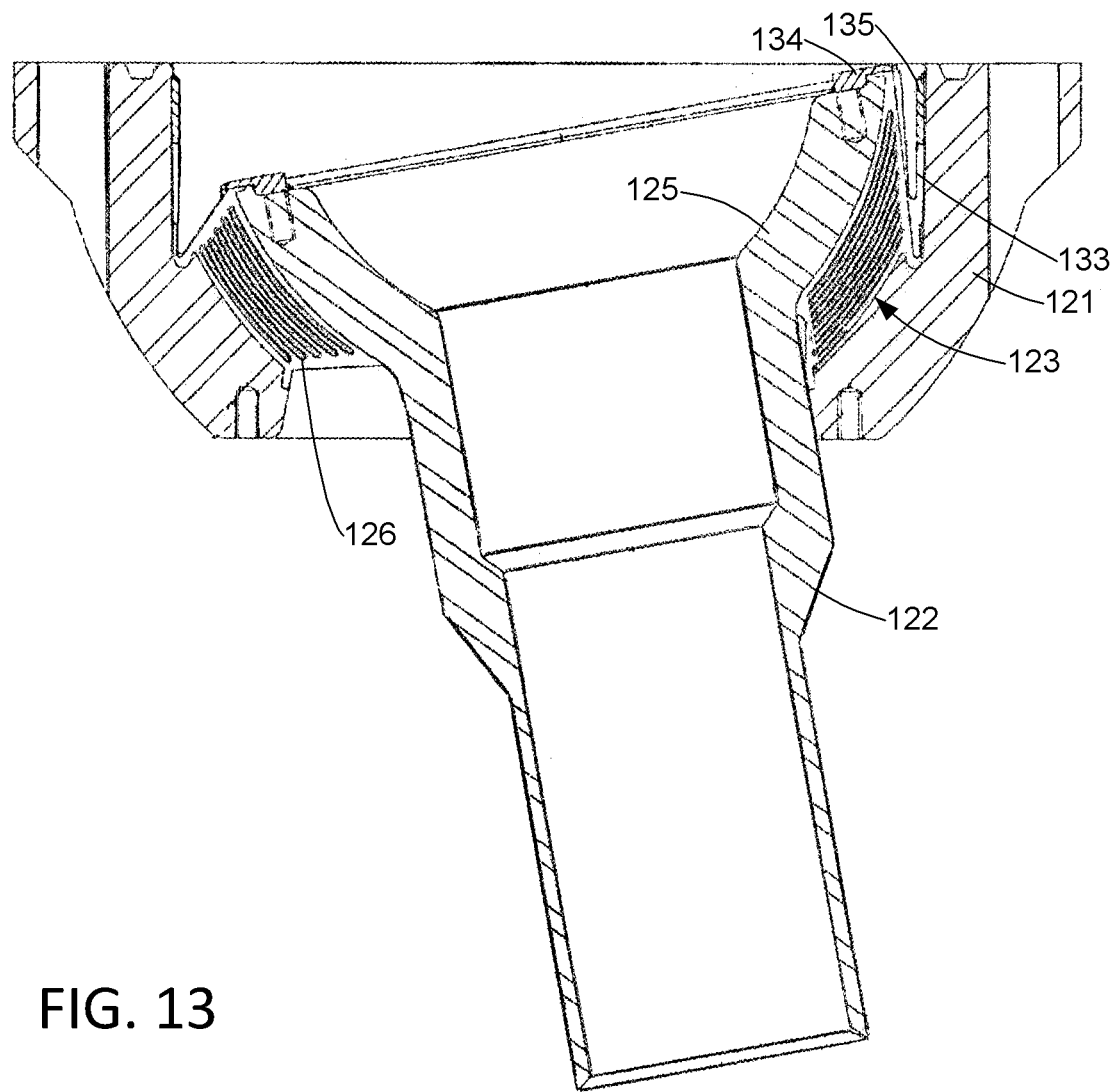
FIG. 13 is a lateral cross-section view of the lower assembly in the flexible pipe joint of FIG. 11 with an articulation of about ten degrees.

FIG. 11 shows a lateral cross-section of the second kind of flexible pipe joint 26. The flexible pipe joint 26 has radial symmetry around a central axis 120. The flexible pipe joint has an annular body 121, an extension pipe 122 extending from the body, and an attachment member 124 bolted to the body 121. These components of the flexible pipe joint are made of corrosion resistant steel.

The flexible pipe joint 26 has an annular elastomeric flexible element 123 flexibly mounting the extension pipe 122 to the body 121. The annular elastomeric flexible element 123 encircles the extension pipe 122. Elastomer of the annular elastomeric flexible element 123 is bonded to a hemispherical flange 125 on the upper end of the extension pipe 122, and bonded to an internal seating area of the body 121. The annular elastomeric flexible element 123 has a plurality of metal reinforcements 126, which are constructed and separated by elastomer layers, in a fashion described above with respect to the primary annular elastomeric flexible element 62 in FIG. 4.

The attachment member 124 has an upper attachment flange 127 and a lower flange 128 spaced by a very small gap from the hemispherical flange 125. Opposing surfaces of the lower flange 128 and the hemispherical flange 125 have the shape of a spherical zone centered on a center point 129. The close proximity and contoured surfaces of flange 128 and flange 125 are designed so that upon accidental (or managed) load reversal on extension 122, flange 125 comes into early contact with flange 128, limiting the amount of axial stretching of the flexible element, and thus preventing the development of damaging tri-axial tension stresses in the elastomeric pads of flexible element 123. The flexible pipe joint 26 has a central lumen 130 extending from the upper attachment flange 127 and down through the extension pipe 122. Fluid flowing through the central lumen 130 seeps through the gap between the hemispherical flanges 125, 128 and fills an annular cavity 131 surrounding the lower flange 128 and surrounding a portion of the annular elastomeric flexible element 123. This annular cavity 131 is sealed at the top by a ring seal 132 (such as an O-ring, or a metal gasket) clamped between the cover 124 and the body 121. At the bottom, the cavity 131 is sealed by the annular elastomeric flexible element 123.

In order to insulate the annular elastomeric flexible element 123 from heat and chemicals in the fluid that has seeped from the central lumen 130 into the annular cavity 131, an annular flexible boot 133 is disposed in the cavity 131. As shown in FIGS. 11, 12, 13, 14, and 15, the annular flexible boot 133 is folded to fit between and conform to the shape of an outer wall of elastomer of the annular elastomeric flexible element 123 and a cylindrical inner wall of the body 121. The shape of the flexible boot 133 changes by a rolling action to continue to conform to the shape of the outer wall of the annular elastomeric flexible element 123 and the cylindrical inner wall of the body 121 as the extension pipe 122 pivots about the center point 129. The rolling action is seen by a comparison of FIG. 13 to FIG. 12, in which a fold at the bottom of the boot 133 has a height that changes with the angle of inclination of the extension pipe 122.

The flexible boot 133 could be directly bonded with adhesive to the inner wall of the body 121 and the top of the hemispherical flange 125. As shown in FIG. 11, however, the flexible boot 133 is directly bonded with adhesive to an inner ring 134 and an outer ring 135. The inner ring 134 has the shape of a washer in order to be seated on top of the hemispherical flange 125, where it is bonded with adhesive to the top of the hemispherical flange 125. The outer ring 135 has the shape of a short tubular cylinder in order to fit snugly in the body 121 against the inner wall of the body, where it is bonded with adhesive to the inner wall of the body. The inner ring 134 and the outer ring 135 facilitate installation of the flexible boot 133 by maintaining the desired shape of the flexible boot 133 during installation.

Figure 14:
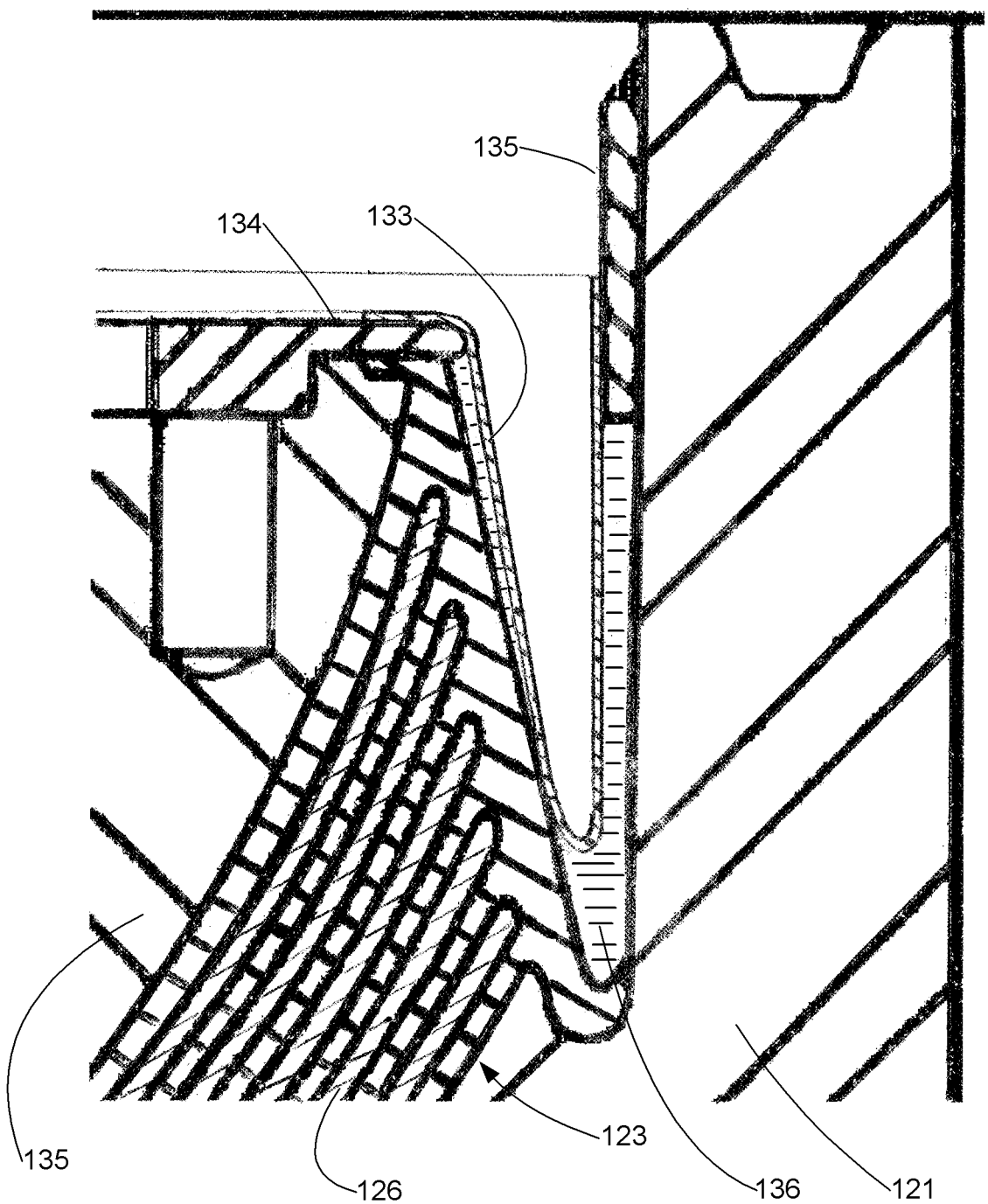
FIG. 14 is a magnified lateral cross-section view of an annular flexible boot as shown in FIG. 11 and FIG. 12.
Figure 15:
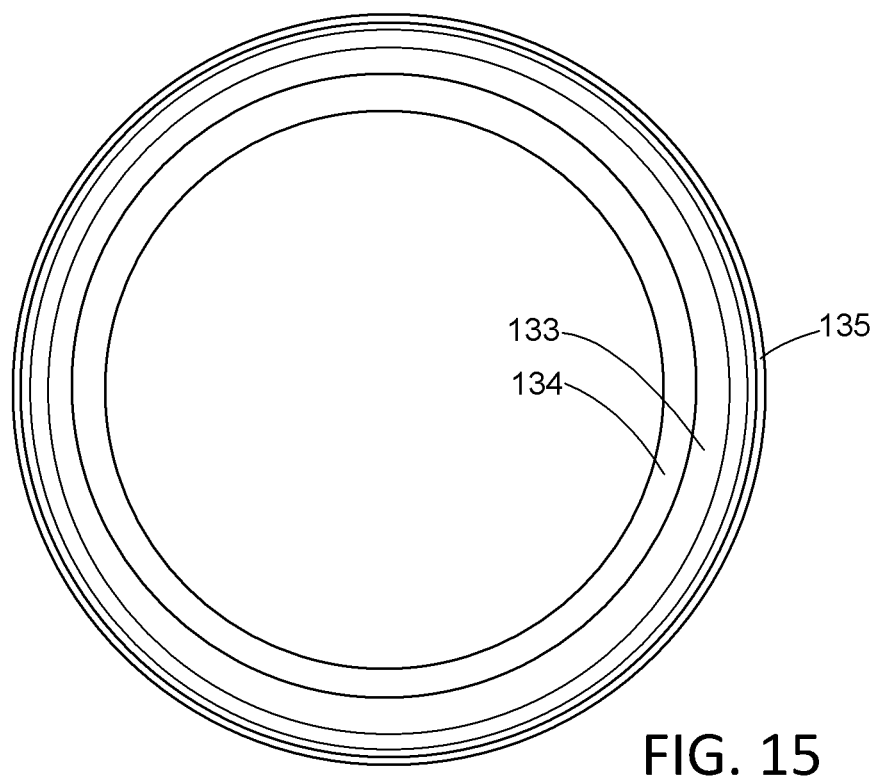
FIG. 15 is a top view of an assembly of the annular flexible boot and inner and outer mounting rings attached to the boot.

As shown in FIG. 14, an annular region 136 between the flexible boot 133 and the elastomer wall of the annular elastomeric flexible element 123 is filled with incompressible fluid so that the incompressible fluid transfers a majority of the pressure from fluid inside the central lumen 130 to the annular elastomeric element 123. For example, the incompressible fluid is water-based hydraulic fluid compatible with the elastomeric material of the annular elastomeric flexible element 123. The water-based hydraulic fluid consists essentially of a mixture of water and an antifreeze agent, such as ethylene glycol or propylene glycol. A suitable incompressible fluid is Compenol water-based hydraulic fluid. For example, a measured amount of the incompressible fluid is introduced just before installation of the flexible boot 133, and the flexible boot is pressed down during installation to remove any air that would otherwise be trapped under the flexible boot.

Figure 16:
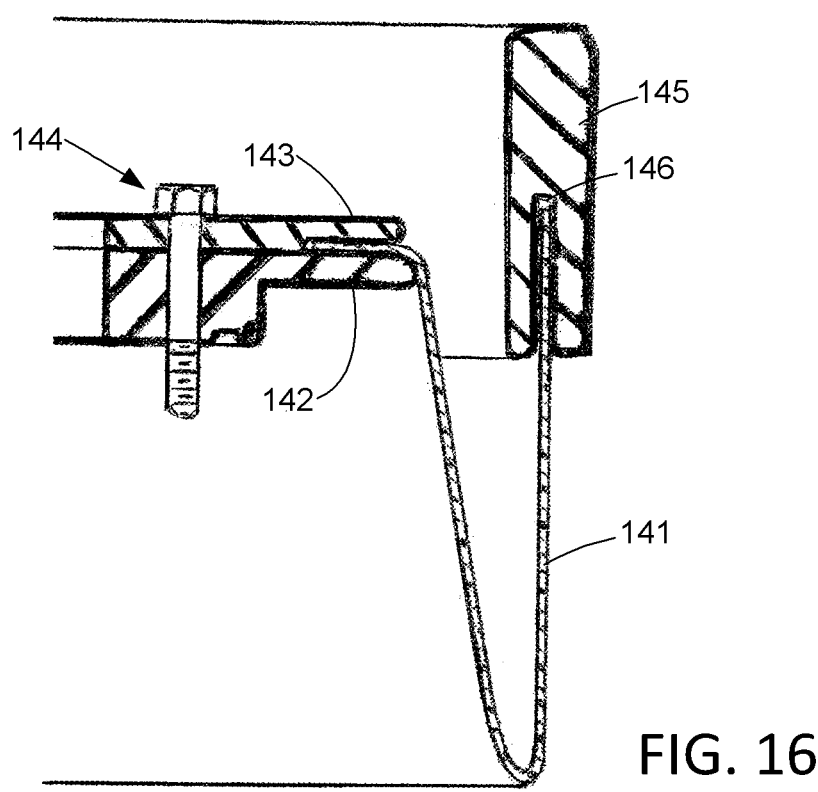
FIG. 16 is a lateral cross-section view of an alternative construction for mechanical connections of the annular flexible boot of FIG. 15.

FIG. 16 shows an alternative construction for mechanical connections of an annular flexible boot 141 similar to the flexible boot 133. As shown in FIG. 16, an inner portion of the flexible boot 141 is bonded to a first inner ring 142 similar to the inner ring 134, and a second inner ring 143 is assembled over the first inner ring 142 and secured by fasteners 144 (such as bolts or machine screws) to clamp the inner end of the flexible boot 141 between the second inner ring 143 and the first inner ring 142. The fasteners 144, for example, fasten the assembly of the first inner ring 142 and the second inner ring 143 to the top of a hemispherical flange of an extension pipe.

An outer portion of the flexible boot 141 is received in an annular groove in a lower end of an outer ring 145. The outer ring 145 has an outer diameter sized to fit snugly with the inner wall of a flexible pipe joint body, and sufficient radial thickness for securely fastening the flexible boot to the outer ring by action of a crimping tool that reduces the radial gap width of the annular groove 146.

The flexible boots 133 and 141 can be made from cylindrical tubular layers of elastomer, reinforcement, and metalized polymer film. The cylindrical tubular layers are laminated, deformed, and then bonded in a molded process. The cylindrical tubular layers should have elastic properties or corrugations for expansion and contraction in a circumferential direction, and some resiliency against deformation in the longitudinal direction.

Figure 17:
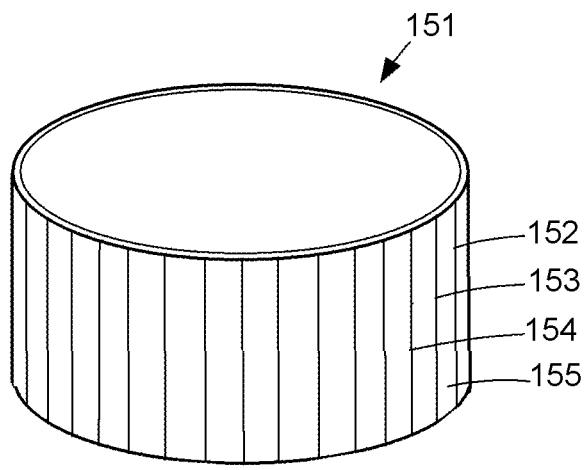
FIG. 17 is an oblique view of a layer of resilient metal reinforcements and metalized polymer film in the annular flexible boot of FIG. 15.

For example, FIG. 17 shows a cylindrical tubular layer 151 of resilient metal reinforcements 152, 153, 154 and metalized polymer film 155. For example, the resilient metal reinforcements are stainless steel wires or narrow strips extending in a longitudinal direction.

Figure 18:
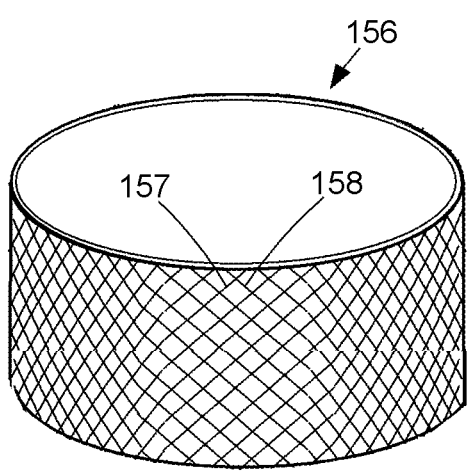
FIG. 18 is an oblique view of a layer of woven fiber reinforcements in the annular flexible boot of FIG. 15.

FIG. 18 shows a cylindrical tubular layer 156 of woven fiber reinforcements 157, 158. For example, each fiber reinforcement is a thread of polyaramid fiber, such as Nomex® fiber or Kevlar® fiber. The fiber reinforcements 157, 158 are woven as a braid, or as cloth that is cut into a strip that is rolled to form the layer 156.

Figure 19:
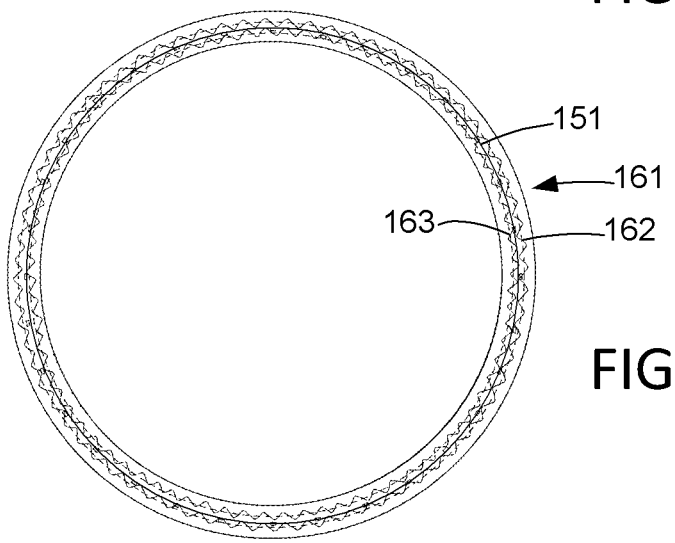
FIG. 19 is a top cross-section view of an assembly of a layer of resilient metal reinforcements as shown in FIG. 17 sandwiched between two layers of woven fiber reinforcements as shown in FIG. 18.
Figure 20:
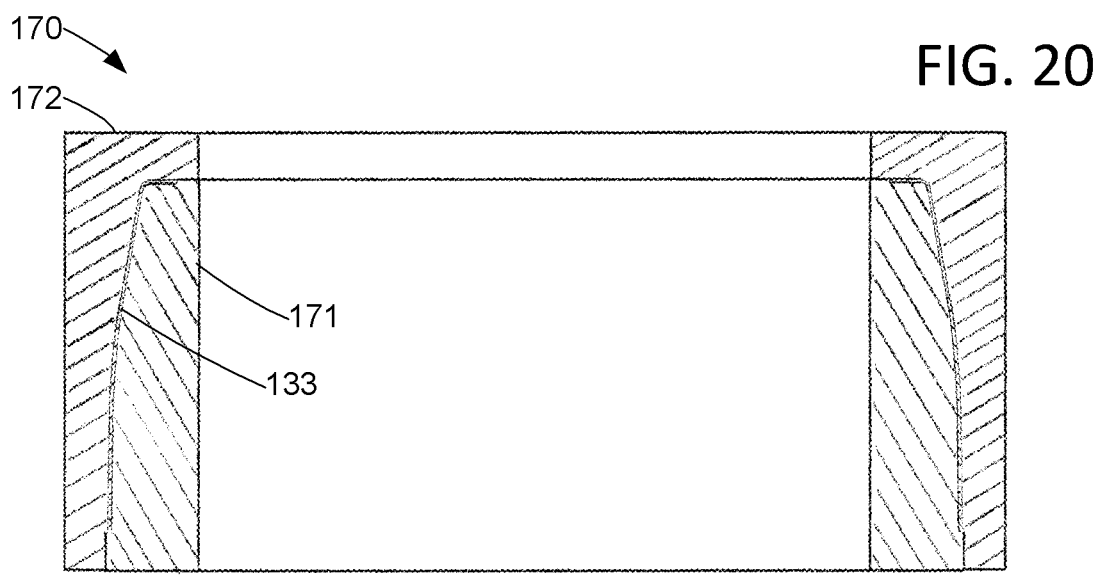
FIG. 20 is lateral cross-section view of a mold being used to mold the assembly of FIG. 19 to make the annular flexible boot of FIG. 15.

FIG. 19 shows a top cross-section view of an assembly 161 of the cylindrical tubular layer 151 of resilient metal reinforcements and metalized polymer film as shown in FIG. 17 sandwiched between two cylindrical tubular layers 162, 163 of woven fiber reinforcements. Each of the layers 162, 163 of woven fiber reinforcements is similar to the layer 156 shown in FIG. 18. The assembly 161 is formed, for example, when the layers 151, 162, 163 are laid up over an inner tube 171 of a two-piece mold 170 as shown in FIG. 20. An outer tube 172 of the mold 170 is slipped onto the assembly in order to form the flexible boot 133 by injection molding or thermo-compression molding. After the flexible boot 133 is removed from the mold 170, the lower half of the boot is rolled-up upon itself to produce the shape show in FIGS. 11 to 14.

Figure 21:
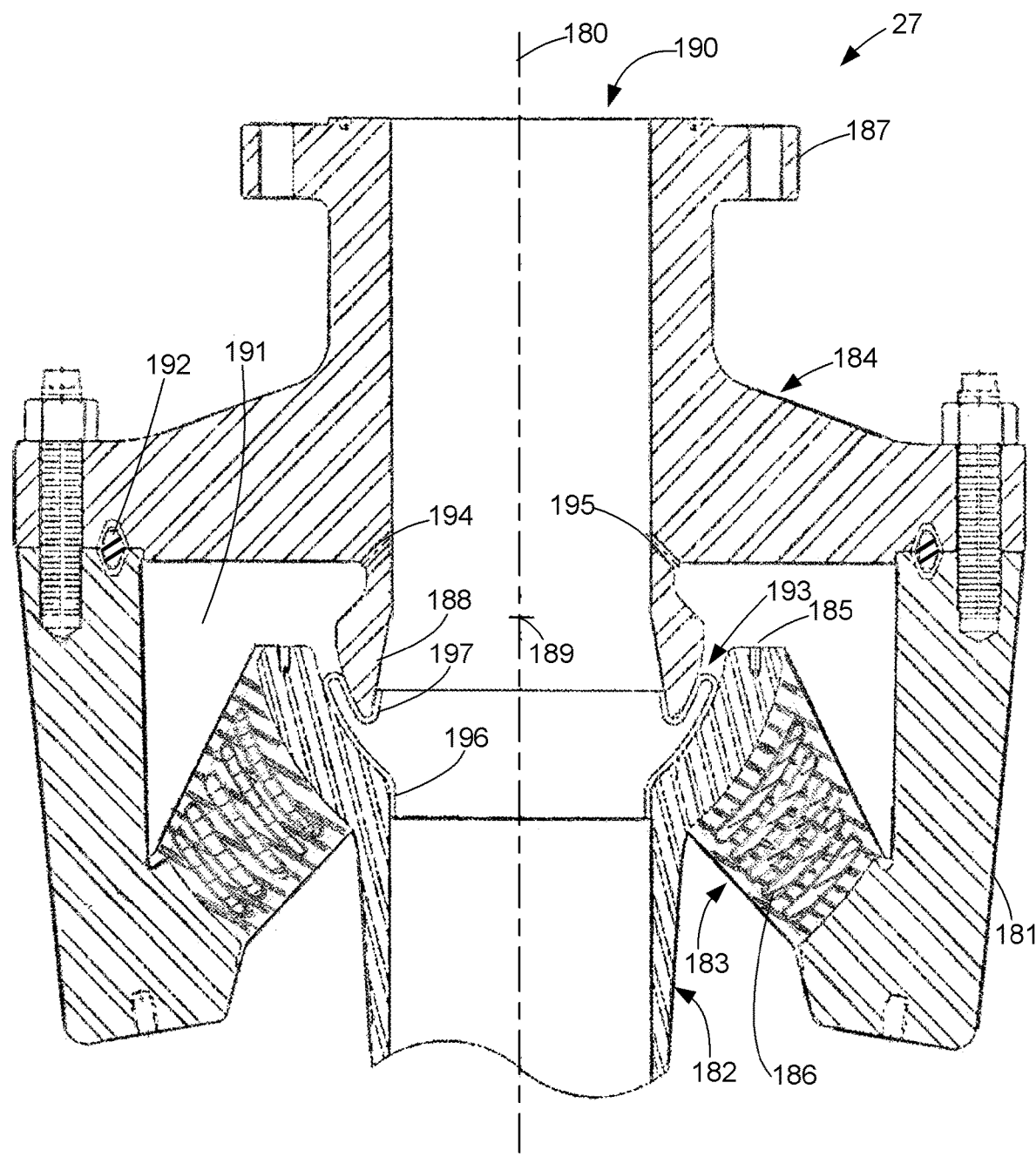
FIG. 21 is a lateral cross-section view of a third kind of flexible pipe joint.
Figure 22:
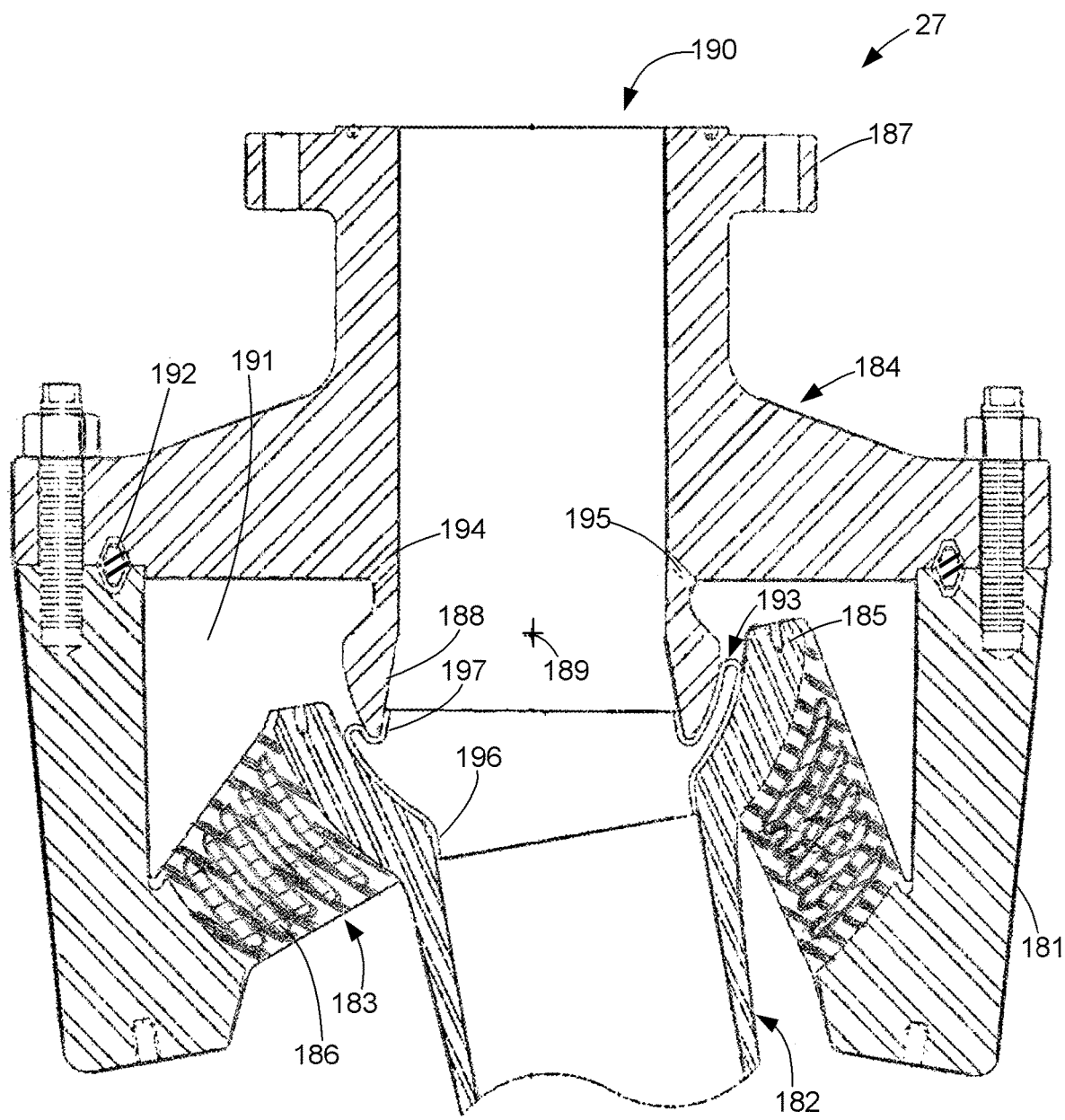
FIG. 22 is a lateral cross-section view of the flexible pipe joint of FIG. 12 with an articulation of about ten degrees.

FIG. 21 shows a lateral cross-section of the third kind of flexible pipe joint 27. The flexible pipe joint 27 has radial symmetry around a central axis 180. The flexible pipe joint 27 has an annular body 181, an extension pipe 182 extending from the body, and an attachment member 184 bolted to the body. These components of the flexible pipe joint are made of corrosion resistant steel.

The flexible pipe joint 27 has an annular elastomeric flexible element 183 mounting the extension pipe 182 to the body 181. The annular elastomeric flexible element 183 encircles the extension pipe 182. Elastomer of the annular elastomeric flexible element 183 is bonded to a hemispherical flange 185 on the upper end of the extension pipe 182, and bonded to an internal seating area of the body 181. The annular elastomeric flexible element 183 has a plurality of metal reinforcements 186, which are constructed and separated by elastomer layers, in a fashion described above with respect to the primary annular elastomeric flexible element 62 in FIG. 4.

The attachment member 184 has an upper attachment flange 187 and a lower flange 188 spaced by a gap from the hemispherical flange 185. Opposing surfaces of the lower flange 188 and the hemispherical flange 185 have the shape of a spherical zone centered on a center point 189. The flexible pipe joint 27 has a central lumen 190 extending from the upper attachment flange 187 and down through the extension pipe 182. The annular elastomeric flexible element 183 encircles the extension pipe 182 and thus encircles the central lumen 190. Fluid flowing through pressure relief passages 194, 195 from the central lumen 190 fills an annular cavity 191 surrounding the lower flange 188 and surrounding a portion of the annular elastomeric flexible element 183. This annular cavity 191 is sealed at the top by a metal gasket or an elastomeric ring seal 192 clamped between the attachment member 184 and the body 181. At the bottom, the cavity 191 is sealed by the annular elastomeric flexible element 183.

In order to insulate the annular elastomeric flexible element 183 from heat and chemicals from fluid flowing through the central lumen 190, an annular flexible boot 193 in the shape of half of a toroid extends into the gap between the lower flange 188 and the hemispherical flange 185 on the upper end of the extension pipe 182. As shown in FIGS. 21, 22, 23, 24, and 25, the toroidal flexible boot 193 is folded to fit between and conform to the shape of the opposing surfaces of the lower flange 188 and the hemispherical flange 185. The flexible boot 193 also has end portions 196, 197 that conform to the shape of the central lumen 190. The upper end portion 197 conforms to a conical shape of the central lumen 190 on an inner wall of the lower flange 188. The lower end portion 197 conforms to a cylindrical shape of the central lumen 190 on an inner wall of the extension pipe 182.

When the extension pipe 182 pivots about the center point 189, the shape of the flexible boot 193 changes by a rolling action to conform to the shape of the opposing surfaces of the lower flange 188 and the hemispherical flange 185. The rolling action is seen by a comparison of FIG. 21 to FIG. 22, in which a fold at the outer circumference of the boot 193 has a height and radius from the central axis 180 that changes with the angle of inclination of the extension pipe 182.

Figure 23:
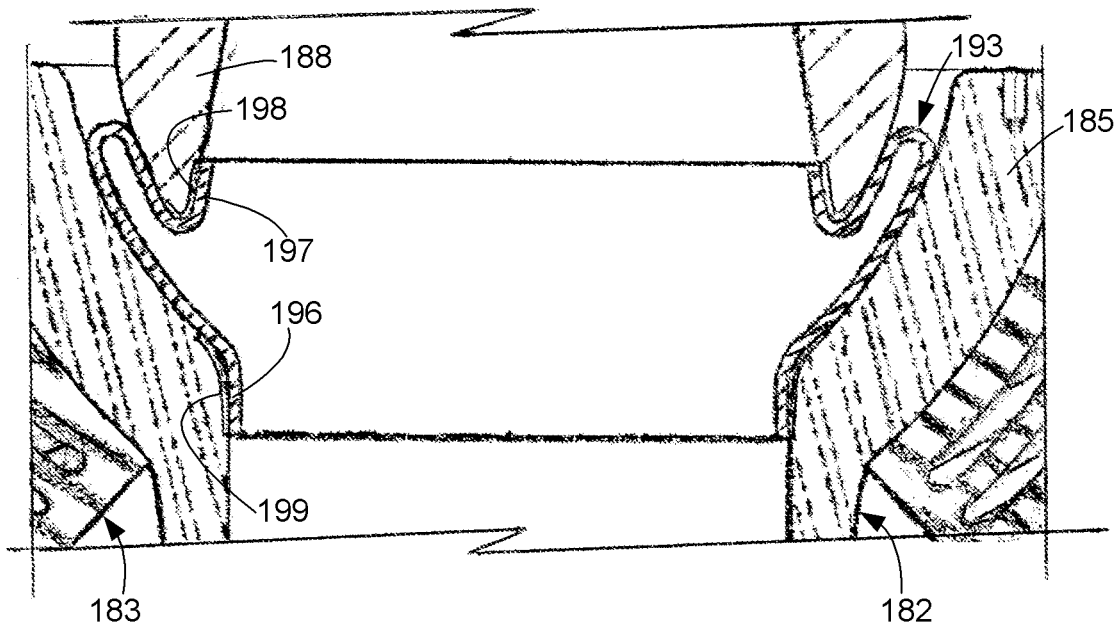
FIG. 23 is a magnified view of a toroidal flexible boot as shown in FIG. 22.

FIG. 23 shows that the upper end 197 of the flexible boot 193 is directly bonded with adhesive 198 to the inner wall of the lower flange 188, and the lower end 196 of the flexible boot 193 is directly bonded with adhesive 199 to the inner wall of the extension pipe 182.

Figure 24:
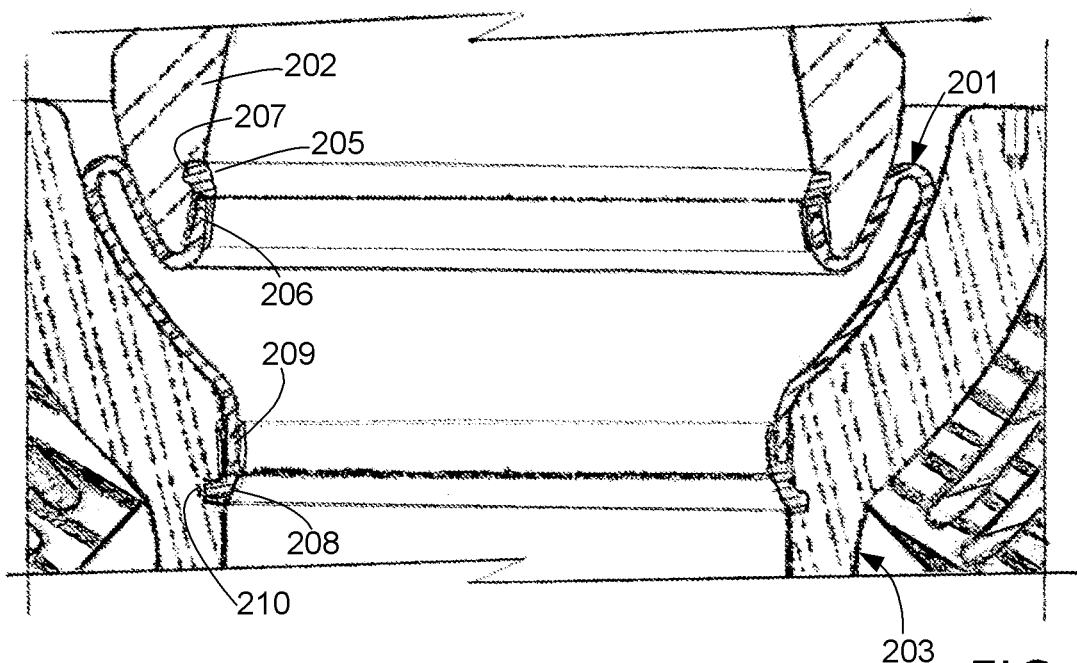
FIG. 24 is a lateral cross-section view showing alternative mechanical connections of a thermal insulating boot to walls of a central lumen of a flexible pipe joint.
Figure 25:
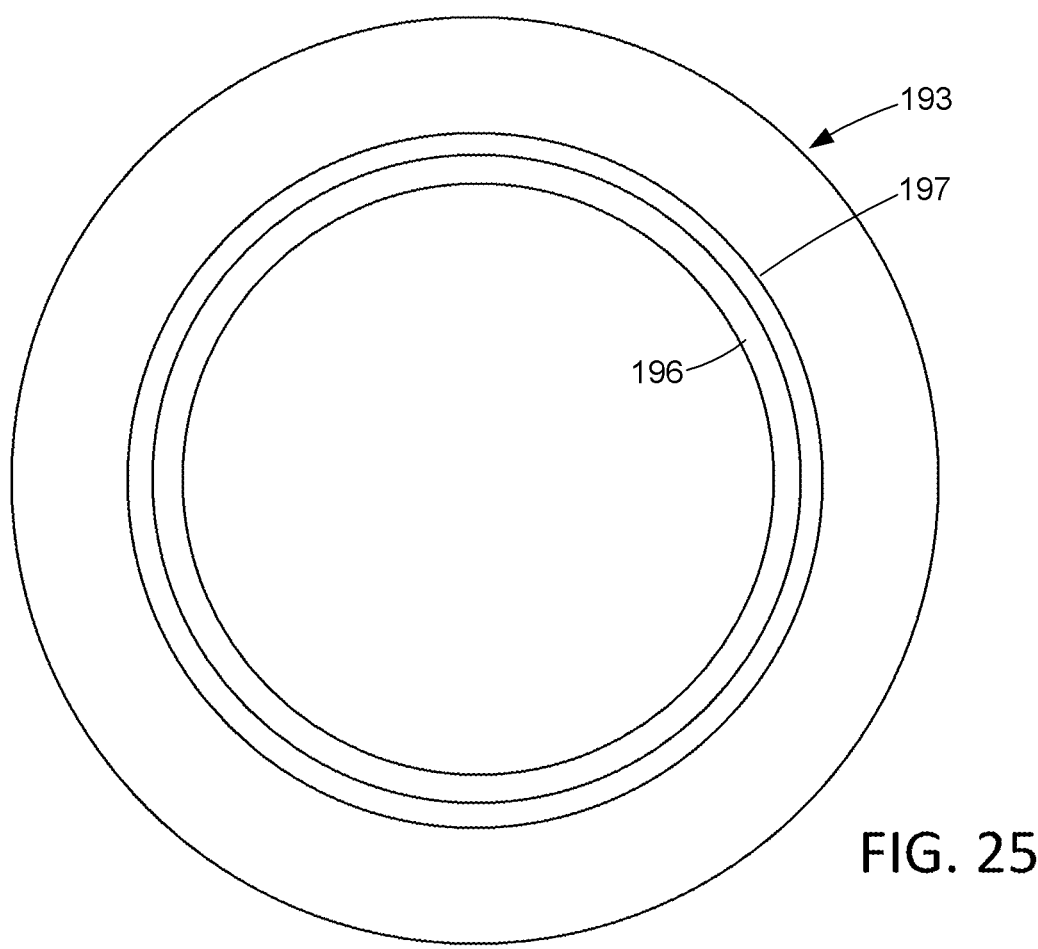
FIG. 25 is a top view of the toroidal boot in isolation.

FIG. 24 shows an alternative construction similar to the construction shown in FIG. 23. In this example, a toroidal flexible boot 201 (which is identical to the toroidal flexible boot 193) is mechanically secured to a lower flange 202 and to an extension pipe 203. An upper metal ring 205 has an annular groove to receive an upper end of the toroidal flexible boot 201. The upper metal ring 205 is radially expanded into an internal annular groove 207 in the lower flange 202. A lower metal ring 208 has an annular groove 209 to receive a lower end of the flexible boot 201. The lower metal ring 208 is radially expanded into an internal annular groove 210 in the extension pipe 203.

The toroidal flexible boot 193 can be made from layers of elastomer, reinforcement, and metalized polymer film in a way similar to the way described above with reference to FIGS. 17 to 20 for manufacturing the flexible boot 133. The flexible boot 193, however, has a more convoluted shape than the flexible boot 133, and therefore a more complicated mold is used for molding the flexible boot 193.

Figure 26:
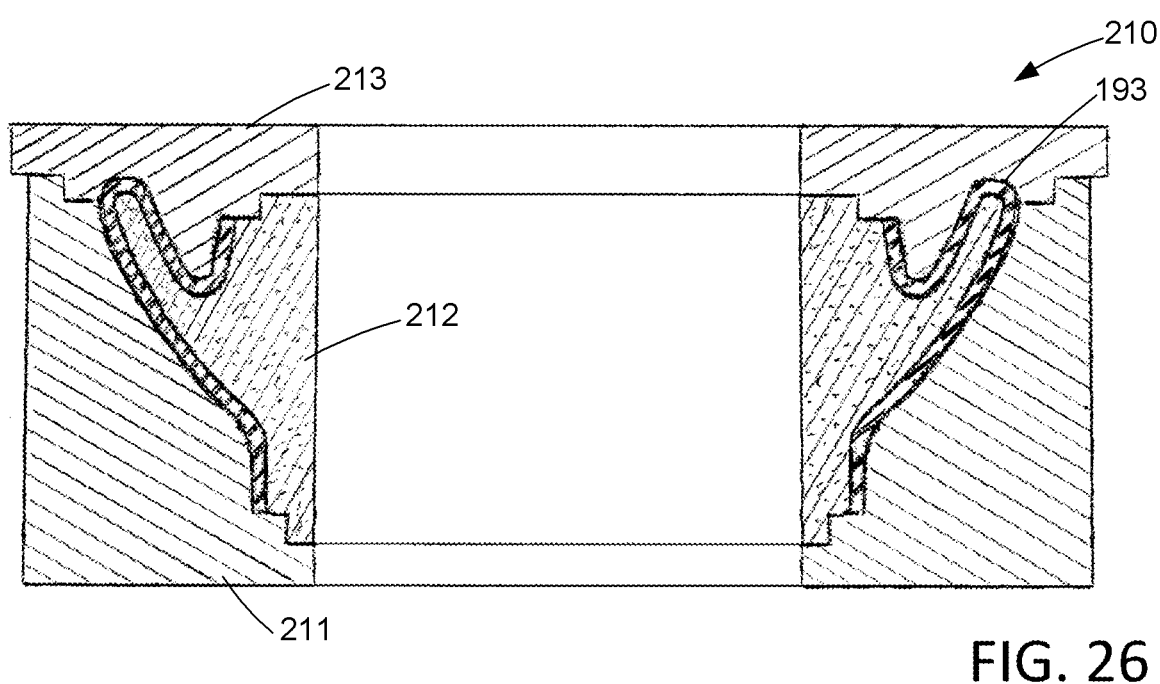
FIG. 26 is a lateral cross-section view of a mold for molding the toroidal boot.

FIG. 26 shows a mold 210 for molding the flexible boot 193. The mold includes an annular bottom piece 211, an annular internal piece 212, and an annular top piece 213. The component layers of the flexible boot 193 are laid up upon the internal annular piece, and then the mold is closed by engaging the lower piece 211 with the internal piece 212, and engaging the top piece 213 with the lower piece and the internal piece. The component layers are fused together by injection of molten polymer or by thermo-compression. After the flexible boot 193 has been molded, the top piece 213 and the bottom piece 211 are removed, and then the flexible boot 193 is removed from the internal piece.

If the flexible boot is so heavily reinforced that it would be damaged by forcible removal from the internal piece 212, then the internal piece could be made of sacrificial material. In this case the internal piece 212 would be destroyed in order to liberate the flexible boot 193 from the internal piece at the end of the molding process. For example, the internal piece 212 could be machined from aluminum or zinc alloy that would be readily soluble in acid or alkali, or the internal piece could be molded from cement made acid soluble or crushable by the addition of calcium carbonate.

In the examples above, the annular flexible boots have been described as having at least one metal layer impervious to invasive gas. If deleterious invasive gas is absent from the fluid, then the metal layers could be omitted from the flexible boot, and the flexible boot could still provide thermal insulation and/or pressure isolation of the annular elastomeric flexible element.

In the examples above, a different kind of annular flexible boot for thermal or chemical insulation has been used in each of three different kinds of flexible pipe joint having an annular elastomeric flexible element flexibly mounting an extension pipe to a body of the flexible pipe joint. It is also possible to use the different kinds of annular flexible boot in the same flexible pipe joint. This would provide more than one layer of thermal or chemical insulation of the annular elastomeric flexible element. For example, the flexible boot 76 in FIG. 4 could be added to the flexible pipe joint 26 in FIG. 11, or added to the flexible pipe joint 27 in FIG. 21. The flexible boot 133 in FIG. 11 could be added to the flexible pipe joint 22 in FIG. 4, or added to the flexible pipe joint 27 in FIG. 21. Alternatively, for example, the flexible boot 76 in FIG. 4 and the flexible boot 193 in FIG. 21 could be added to the flexible pipe joint 26 in FIG. 11, to form a triplyredundant isolation boot system. If high temperature fluid were flowing through the flexible pipe joint, then more than one layer of thermal insulation would result in the annular elastomeric flexible element operating at a lower temperature to extend the lifetime of the annular elastomeric flexible element. In addition, by using more than one flexible boot for thermal insulation, protection from invasive gas could be achieved by including a metal layer in only one of the flexible boots, and the metal layer could be put in the colder one of the flexible boots, so that stress corrosion cracking of this metal layer would be reduced by the lower temperature due to the thermal insulation of the warmer one of the flexible boots.

In the examples above, each flexible pipe joint has an attachment member for attaching the flexible pipe joint to a first segment of a pipeline, and an extension pipe for attaching the flexible pipe joint to a second segment of the pipeline, in order to permit fluid from the pipeline to flow through the flexible pipe joint. The attachment member and the extension pipe may be attached to the pipeline segments in various ways, such as by welding as well as bolting or clamping flanges together. Moreover, the attachment member may have various forms, such as a second extension pipe flexibly mounted to the body by an additional annular elastomeric flexible element, and in this case, the flexible pipe joint may have a second primary flexible boot for thermally or chemically insulating the second primary annular elastomeric flexible element. If the attachment member were a second extension pipe flexibly mounted to the body by a second primary annular elastomeric flexible element and the flexible pipe joint uses a flexible boot in the form of a cylindrical tube having one end attached to an end of the first extension pipe, then the second end of the cylindrical tube could be attached to an internal end of the second extension pipe.

The flexible thermal or chemical insulating boots described above could be used in flexible pipe joints that have additional means for thermal or chemical insulation of a secondary flexible element. The additional means for thermal or chemical insulation may include, for example, a two-stage bellows, a heat shield of low heat conductivity material integrated into the inner profile of the pipe extension and interposed between the central bore of the pipe joint and the annular elastomeric flexible element, and low heat conductivity metal alloy components between the hot production fluid and the flexible element, for example as described in Moses et al. U.S. Pat. No. 7,341,283 issued Mar. 11, 2008.

What is claimed is:

1. A flexible pipe joint comprising:
a body;
an attachment member mechanically coupled to the body operable to attach the body to a first segment of a pipeline;
an extension pipe extending from the body and operable to attach the body to a second segment of the pipeline, and
at least one annular elastomeric flexible element flexibly coupling the extension pipe to the body to permit articulation of the flexible pipe joint whereby the extension pipe is operable to pivot with respect to the body;
wherein the attachment member and the extension pipe define a lumen through the flexible pipe joint for fluid from the pipeline to flow through the flexible pipe joint, and the at least one annular elastomeric flexible element encircles the lumen; and
an annular flexible boot operable to thermally and chemically insulate the at least one annular elastomeric flexible element from the fluid flowing through the flexible pipe joint, wherein the annular flexible boot encircles the lumen, and the annular flexible boot has a first annular end attached to the extension pipe and a second annular end mounted so that pivoting of the extension pipe with respect to the body causes a flexing of the annular flexible boot and a majority of the annular flexible boot has a shape conforming to a shape of an annulus formed by neighboring components of the flexible pipe joint,
wherein the annular flexible boot includes a metal layer operable to prevent diffusion of invasive gas from the lumen.

2. The flexible pipe joint as claimed in claim 1, wherein the at least one annular elastomeric flexible element encircles the extension pipe.

3. The flexible pipe joint as claimed in claim 1, wherein the first annular end and the second annular end are secured and sealed so that the annular flexible boot contains pressure.

4. The flexible pipe joint as claimed in claim 1, wherein the annular flexible boot includes woven fiber in an elastomer matrix.

5. The flexible pipe joint as claimed in claim 1, wherein the annular flexible boot includes a layer of metalized polymer film.

6. The flexible pipe joint as claimed in claim 1, wherein flexible pipe joint includes a first annular metal ring secured to the first end of the annular flexible boot operable to mechanically couple the first annular end of the annular flexible boot to the extension pipe, and a second annular metal ring secured to the second annular end of the annular flexible boot operable to mechanically couple the second annular end of the annular flexible boot to the body.

7. The flexible pipe joint as claimed in claim 6, wherein the first annular metal ring is mechanically secured to an end of the extension pipe.

8. The flexible pipe joint as claimed in claim 6, wherein the first annular metal ring is mechanically secured to an inner wall of the extension pipe.

9. The flexible pipe joint as claimed in claim 1, wherein the flexible annular boot is a cylindrical tube, and the cylindrical tube has an inner wall that is an inner wall of the lumen.

10. The flexible pipe joint as claimed in claim 9, wherein a first end of the cylindrical tube is secured to an inner wall of the extension pipe, and a second end of the cylindrical tube is secured to an inner wall of the attachment member.

11. The flexible pipe joint as claimed in claim 9, wherein the flexible pipe joint includes a center ring encircling the cylindrical tube, the center ring is disposed between the extension pipe and the attachment member, and the flexible pipe joint includes a first secondary annular elastomeric flexible element encircling the cylindrical tube and mechanically coupling the center ring to the end of the extension pipe, and the flexible pipe joint includes a second secondary annular elastomeric flexible element encircling the cylindrical tube and mechanically coupling the centering ring to the attachment member.

12. The flexible pipe joint as claimed in claim 11, wherein the first secondary annular elastomeric flexible element and the second secondary annular elastomeric flexible element seal an annular region around the cylindrical tube, and the annular region around the cylindrical tube is filled with incompressible fluid for transferring pressure from the cylindrical tube to the first secondary annular elastomeric flexible element and the second secondary annular elastomeric flexible element.

13. The flexible pipe joint as claimed in claim 1, wherein a fold in the annular flexible boot rolls along a direction when the extension pipe is pivoted.

14. The flexible pipe joint as claimed in claim 13, wherein the annular flexible boot includes resilient reinforcement aligned along the direction.

15. The flexible pipe joint as claimed in claim 14, wherein an annular region between the annular flexible boot and the outer wall of the at least one annular elastomeric flexible element is filled with an incompressible fluid operable to transfer pressure from the annular flexible boot to the outer wall of the at least one annular elastomeric flexible element.

16. The flexible pipe joint as claimed in claim 1, wherein the annular flexible boot contacts and is supported by the neighboring component of the flexible pipe joint.

17. The flexible pipe joint as claimed in claim 1, wherein the annular flexible boot further includes an inner layer and an outer layer, wherein the metal layer is disposed between the inner layer and the outer layer.

18. The flexible pipe joint as claimed in claim 17, wherein the inner layer includes temperature resistant polymer, wherein the outer layer includes temperature resistant polymer reinforced with metal.

19. The flexible pipe joint as claimed in claim 18, wherein the inner layer is reinforced with metal, wherein the outer layer is reinforced with metal.

20. The flexible pipe joint as claimed in claim 19, wherein the metal of the inner layer includes a single braid of metal wire, wherein the metal of the outer layer includes a plurality of braids of metal wire.

21. The flexible pipe joint as claimed in claim 1, wherein the metal layer includes a plurality of metal layers, wherein each of the metal layers has helical corrugations.

* * * * *